US009558297B1

(12) United States Patent
Bailey et al.

(10) Patent No.: US 9,558,297 B1
(45) Date of Patent: Jan. 31, 2017

(54) MEMORY MANAGEMENT TECHNIQUES

(71) Applicant: EMC Corporation, Hopkinton, MA (US)

(72) Inventors: Charles C. Bailey, Cary, NC (US); Joseph S. Ash, Hudson, MA (US); Alan L. Taylor, Cary, NC (US); Jason L. Taylor, Apex, NC (US); Michael Hamel, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 14/227,234

(22) Filed: Mar. 27, 2014

(51) Int. Cl.
G06F 17/30 (2006.01)

(52) U.S. Cl.
CPC .............................. G06F 17/30961 (2013.01)

(58) Field of Classification Search
USPC ......................................... 707/797, 812, 813
See application file for complete search history.

(56) References Cited

U.S. PATENT DOCUMENTS

| 5,371,885 A * | 12/1994 | Letwin ................. G06F 3/0608 |
| 5,930,827 A * | 7/1999 | Sturges ................ G06F 12/023 711/170 |
| 6,477,612 B1 * | 11/2002 | Wang .................. G06F 12/1009 711/2 |
| 8,935,508 B1 * | 1/2015 | Ardhanari ......... G06F 17/30949 707/797 |
| 2006/0155792 A1 * | 7/2006 | Inoue .................... G06F 12/023 |
| 2007/0100916 A1 * | 5/2007 | Konecny ............... G06F 9/5016 |
| 2008/0148002 A1 * | 6/2008 | Fleming ................ G06F 12/023 711/170 |
| 2009/0172293 A1 * | 7/2009 | Sun ...................... G06F 12/0862 711/137 |

OTHER PUBLICATIONS

"Tree Rotation," Wikipedia, Feb. 19, 2014, 6 pp.
"AVL tree," Wikipedia, Mar. 12, 2014, 5 pp.

* cited by examiner

Primary Examiner — Cam-Linh Nguyen
(74) Attorney, Agent, or Firm — Muirhead and Saturnell, LLC

(57) ABSTRACT

Techniques for memory management are described. A memory management data structure may include a tree structure of nodes each representing a free memory portion of a size used as a key value. The tree may be a modified AVL tree with nodes sorted based on key values corresponding to free memory portion sizes. The data structure may include a first list representing a memory map corresponding to different memory portions where each entry of the first list represents a memory portion with an associated memory address range that is not contiguous with respect to any other memory address range of any other memory portion represented by an entry on the first list. Each entry of the first list representing a free memory portion may be associated with a node of the tree structure.

20 Claims, 15 Drawing Sheets

MEMORY MANAGEMENT TECHNIQUES

BACKGROUND

Technical Field

This application generally relates to memory management.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

SUMMARY OF THE INVENTION

In accordance with one aspect of the invention is a memory including a memory management data structure, the memory management data structure comprising: a tree structure including one or more nodes, wherein each of the one or more nodes represents a free memory portion of a particular size used as a key value for said each node, said tree structure being organized in accordance with one or more key values of the one or more nodes such that, for a first of the one or more nodes having a first key value, each other node of the tree structure having a key value less than the first key value of the first node is included in a left subtree of the first node, and each other node of the tree structure having a key value more than the first key value of the first node is included in a right subtree of the first node; and a first list representing a memory map of memory addresses corresponding to different memory portions, the first list including one or more entries, each of the one or more entries representing a memory portion that has an associated memory address range that is not contiguous with respect to any other memory address range associated with any other memory portion represented by an entry on the first list, wherein each entry of the first list representing a free memory portion is associated with a node of the tree structure. The first list may include at least one entry corresponding to an allocated memory portion and at least one entry corresponding to a free memory portion available for allocation. The at least one entry corresponding to a free memory portion may be associated with one node of the tree structure. At least one node of the tree structure representing a first free memory portion of a first size may be included in a duplicate list, the duplicate list including a plurality of nodes of the tree structure where each node of the duplicate list represents another free memory portion of the first size. A height of a particular node in the tree structure may be a distance of a longest path from the particular node to a leaf node. The tree structure may be balanced such that, for a pair of sibling nodes of the tree structure, a difference between a first height of a first of the sibling nodes and a second height of a second of the sibling nodes is not more than one (1). Only one of the nodes in the duplicate list may contribute to the height of the tree structure and each other node of the duplicate list besides said one node may not not have an associated height with respect to the tree structure whereby said each node does not contribute to the height of the tree structure. The memory may be included in a data storage system. The first list may be a doubly linked list. The duplicate list may be a doubly linked list.

In accordance with another aspect of the invention is a method for managing memory comprising: receiving a memory management data structure including a tree structure and a first list, said tree structure including one or more nodes, wherein each of the one or more nodes represents a free memory portion of a particular size used as a key value for said each node, said tree structure being organized in accordance with one or more key values of the one or more nodes such that, for a first of the one or more nodes having a first key value, each other node of the tree structure having a key value less than the first key value of the first node is included in a left subtree of the first node, and each other node of the tree structure having a key value more than the first key value of the first node is included in a right subtree of the first node, said first list representing a memory map of memory addresses corresponding to different memory portions, the first list including one or more entries, each of the one or more entries representing a memory portion that has an associated memory address range that is not contiguous with respect to any other memory address range associated with any other memory portion represented by an entry on the first list, wherein each entry of the first list representing a free memory portion is associated with a node of the tree structure; receiving a first request to allocate a first portion of memory of a first size; searching the tree structure to determine a first free memory portion from which to allocate memory for the first request; and updating the memory management data structure in accordance with allocating memory from the first free memory portion for the first request. Updating may include updating the tree structure by performing any one or more of deleting a node from the tree structure representing the first free memory portion and modifying a key value of a node from the tree structure representing the first free memory portion. The first free memory portion may be represented by a first entry of the first list and the method may further include: determining whether a size of the first free memory portion is equal to or more than the first size; if it is determined that the size of the first free memory portion is equal to the first size, said updating includes: updating the first entry from the first list to denote the first free memory portion is now allocated; deleting a node from the tree structure representing the first free memory portion; and performing, after said deleting, second processing to ensure the tree structure is balanced in terms of height, wherein a height of a particular node in the tree structure is a distance of a longest path from the particular node to a leaf node and said tree structure is balanced such that, for a pair of sibling nodes of the tree structure, a difference between a first height of a first of the sibling nodes and a second height of a second of the sibling nodes is not more than one (1). The method may also include if it is determined that the size of the first free memory portion is more than the first size, said updating may include: updating the first entry from the first list to correspond to the first size and represent an allocated memory portion; creating a new entry of the first list to represent a remaining amount of unallocated memory of the first free memory portion after allocating an amount of memory equal to the first size; inserting into the tree structure a node representing a free memory portion having a size equal to the remaining amount of unallocated memory; performing, after said inserting, second processing to ensure the tree structure is balanced in terms of height, wherein a height of a particular node in the tree structure is a distance of a longest path from the particular node to a leaf node and said tree structure is balanced such that, for a pair of sibling nodes of the tree structure, a difference between a first height of a first of the sibling nodes and a second height of a second of the sibling nodes is not more than one (1). Searching may include comparing one or more key values of one or more nodes of the tree structure to said first size to locate a free memory portion having a size that is at least the first size. A first set may represent one or more free memory portions each having a node representing said each free memory portion in the tree structure and each being a size that is at least the first size, and wherein the size of the free memory portion may be a minimum size of all one or more free memory portions of the first set. The first free memory portion may have a size that is larger than the first size and updating may include inserting a new node into the tree structure representing a free memory portion having an associated size that is a difference between a current size of the free memory portion prior to allocating memory for the first request and the first size. The method may include receiving a second request to deallocate a second memory portion of a second size whereby said second memory portion has been allocated in connection with a prior memory allocation request. The method may include updating an entry of the first list corresponding to the second memory portion to indicate that the second memory portion is now an unallocated memory portion. The method may include locating a first entry of the first list corresponding to the second memory portion; determining one or more additional entries in the list represent free memory portions having memory addresses contiguous with memory addresses of the second memory portion; and replacing the first entry and the one or more additional entries with a single entry on the first list, said single entry representing a single memory portion that is a combined memory portion including the second memory portion and one or more additional memory portions represented by the one or more additional entries.

In accordance with another aspect of the invention is a computer readable medium comprising code stored thereon that, when executed, performs a method that manages memory, the method comprising: receiving a memory management data structure including a tree structure and a first list, said tree structure including one or more nodes, wherein each of the one or more nodes represents a free memory portion of a particular size used as a key value for said each node, said tree structure being organized in accordance with one or more key values of the one or more nodes such that, for a first of the one or more nodes having a first key value, each other node of the tree structure having a key value less than the first key value of the first node is included in a left subtree of the first node, and each other node of the tree structure having a key value more than the first key value of the first node is included in a right subtree of the first node, said first list representing a memory map of memory addresses corresponding to different memory portions, the first list including one or more entries, each of the one or more entries representing a memory portion that has an associated memory address range that is not contiguous with respect to any other memory address range associated with any other memory portion represented by an entry on the first list, wherein each entry of the first list representing a free memory portion is associated with a node of the tree structure; receiving a first request to allocate a first portion of memory of a first size; searching the tree structure to determine a first free memory portion from which to allocate memory for the first request; and updating the memory management data structure in accordance with allocating memory from the first free memory portion for the first request.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
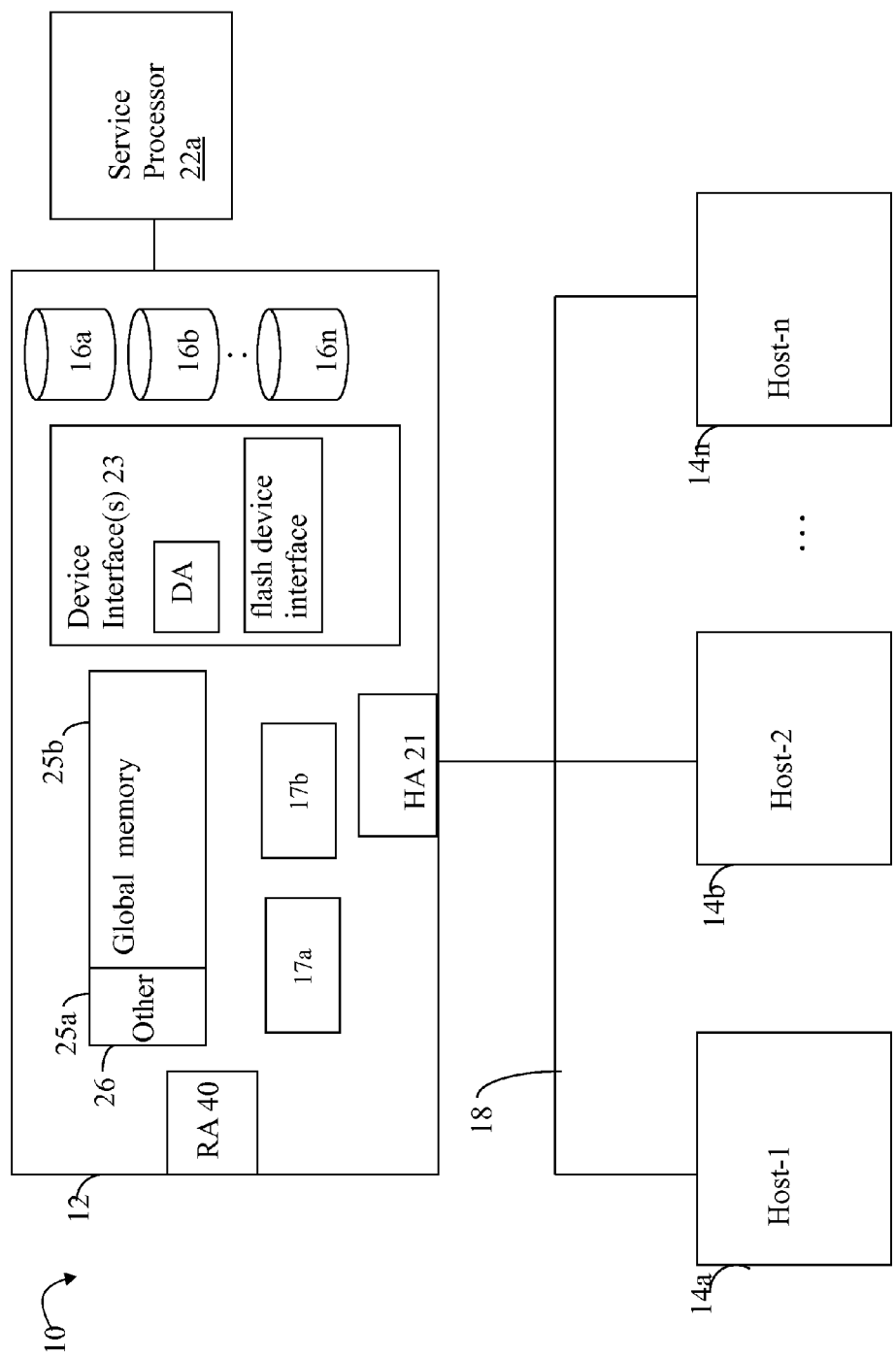
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system may be a single unitary data storage system, such as single data storage array, including two main storage processors or computer processing units (CPUs). Techniques herein may be more generally use in connection with any one or more data storage system each including a different number of main processors than as illustrated herein. The data storage system 12 may be a data storage array, such as a VNX™ data storage array by EMC Corporation of Hopkinton, Mass., including a plurality of data storage devices 16a-16n and two main storage processors or CPUs 17a, 17b. The processors 17a, 17b may be CPUs included in the data storage system for processing requests and commands. In connection with performing techniques herein, an embodiment of the data storage system may include multiple service processors including more than two main CPUs as described. The VNX™ data storage system mentioned above may include two processors 17a, 17b for performing processing in connection with servicing requests. Additionally, the two processors 17a, 17b may be used in connection with failover processing when communicating with the management system 16. More generally, a data storage system may include one or more such main CPUs such as 17a, 17b.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In connection with a data storage system, or more generally any suitable system such as a computer system, techniques may be performed for management of memory. Described in following paragraphs are techniques and an associated memory management data structure that may be used in connection with memory management in a system. Described herein is a memory management structure for tracking free and allocated memory portions. The structure may be used to locate free or available memory portions which are then used to fulfill memory allocation requests. The structure may be used in response to a deallocation or free operation whereby previously allocated memory is now returned to the pool of free or available memory for reallocation with subsequent memory requests. Techniques herein utilize a data structure for memory management which is optimized for efficient memory management operations such as the foregoing memory allocation and deallocation operations.

As described in following paragraphs, an embodiment in accordance with techniques herein may utilize a data structure for memory management that is a combination of a modified AVL tree and a doubly linked list. As described in following paragraphs and figures, the doubly linked list may be used to generally track and manage all virtual memory under management using techniques herein where an entry on the doubly linked list may represent either an allocated memory portion or a free memory portion. Collectively, the entire address range of all entries in the doubly linked list may represent the entire memory address range under management using techniques herein. For simplicity of illustration, examples herein may assume that the entire virtual memory address range under management using techniques herein refers to one large contiguous memory address range. However, note that in an embodiment in accordance with techniques herein, the entire memory address range under management using techniques herein may not be a single contiguous range of addresses. It may be that the entire set of memory under management using techniques herein includes multiple memory address subranges where each subrange may be contiguous. However, the multiple address subranges collectively may or may not be contiguous.

A memory allocation request may be a request for a memory portion of size X (X being an integer representing some number of memory units such as byte). Processing performed to service the request may include searching for a free or available memory portion that has a size of at least X. In an embodiment in accordance with techniques herein, such searching may be performed in an optimized and efficient manner using the modified AVL tree to locate a suitable free memory portion to fulfill the memory allocation request. The foregoing, as well as additional details regarding other operations, and more generally, the techniques and memory management structure, are described in following paragraphs.

Prior to discussing the memory management structure and associated techniques, an initial discussion is provided regarding terms and data structures.

Linked lists are generally known in the art. A doubly linked list includes entries connected using both forward and backward pointers. A forward pointer of a list entry links or points to a next entry in the list. A backward pointer of a list entry links or points to a previous entry in the list. A single linked list uses only one set of pointers—either all forward pointers to connect successive entries or all backward pointers to connect list entries.

A binary tree is a data structure well known in the art and may be defined as a tree structure of nodes where each node in the tree has at most two child nodes, sometimes referred to as a left child and a right child node. The tree includes a root node.

Binary trees may be used to implement binary search trees (BST) providing for efficient sorting and searching. A BST may be referred to as an ordered or sorted binary tree that is a node-based binary tree data structure with following properties:
1. The left subtreeof a node contains only nodes with keys less than the node's key.
2. The right subtree of a node contains only nodes with keys greater than the node's key.
3. Each of the left and right subtrees is also a BST.
4. There are no duplicate nodes (no two nodes have the same key value)

A left subtree of a node may be defined as including a left child node of the node and any further descendant nodes of the left child node. Similarly, a right subtree of a node may be defined as including a right child node of the node and any further descendant nodes of the right child node.

Height with respect to a node of a tree may be defined as a distance of the longest path (in terms of a number of nodes traversed) from the node to a leaf node. Height with respect to a subtree (or tree) having a root node is the height of the root node. A leaf node may be defined as a node in the tree having no child nodes.

Generally, the information represented by each node of a BST may be a record of information rather than a single data element. However, for sequencing purposes, nodes are compared according to their keys associated with such records.

An AVL (Adelson-Velskii and Landis' tree, named after the inventors) tree is a self-balancing BST that may be characterized as height-balanced whereby the height of any two siblings nodes are not permitted to differ by more than one. In an AVL tree, there is a height requirement or property that is maintained whereby the heights of the two child subtrees of any node differ by at most 1. As known in the art, two nodes are siblings if the two nodes have the same parent node (e.g., siblings are the left and right child nodes of any node in the tree). Additionally, with an AVL tree, if at any time they differ by more than one, rebalancing is done to restore the foregoing property. Lookup, insertion, and deletion all take O(log n) time in both the average and worst cases, where n is the number of nodes in the tree prior to the operation. As known in the art, insertions and deletions of nodes in the tree may require the tree to be rebalanced by performing a tree rotation to maintain the above-mentioned height property.

Basic operations of an AVL tree, such as for node insertion and deletion, involve carrying out the same actions as would be carried out on an unbalanced BST as known in the art.

Generally, an insertion of a node having a key value into the tree includes locating the point in the tree at which to insert the node based on its key value to maintain the proper sorted ordering of nodes in the tree based on keys values of the tree nodes. Additionally, modification to the AVL tree, such as for node insertion and deletion operations, may be followed by zero or more operations called tree rotations to thereby restore the height balance property noted above of the subtrees. Such additional checking performed to maintain the height property of the AVL tree is described in more detail elsewhere herein.

Figure 2:
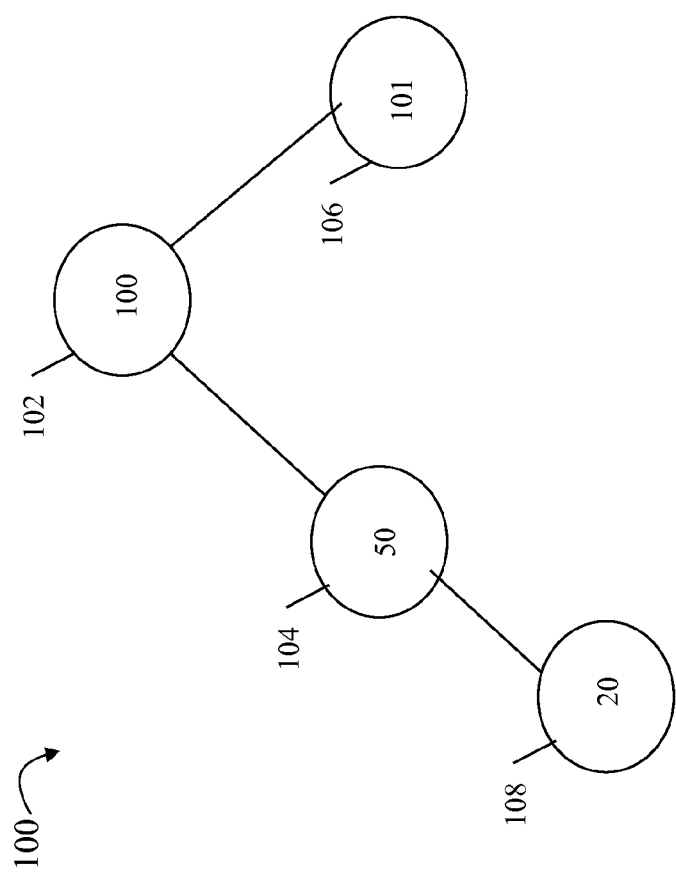
FIG. 2 is an example illustrating an AVL tree.

Referring to FIG. 2, shown is an example of an AVL tree. In the example 100, the root node 102 has a key value of 100 with a left child node 104 and a right child node 106. The node 104 has a key value of 50 and the node 106 has a key value of 101. Node 104 has a left child node 108 with a key value of 20. Note that all nodes included in the left subtree of the root node 102 have a key value less than 100, and all nodes in the right subtree of the root node 102 have a key a key value greater than 100. Additionally, via the AVL tree height property as mentioned above and elsewhere herein, the height of any two subtrees of any node differ by at most 1. For example, consider the height of the left subtree and right subtree of root node 102. The left subtree includes nodes 104 and 108 (with node 104 as the left subtree root) and has a height of 1. The right subtree includes node 106 (with node 106 as the right subtree root) and has a height of 0. Thus, the foregoing is an example of a simple AVL tree.

It should be noted that an embodiment in accordance with techniques herein may denote the height of a node and/or subtree using a variation from that as described above. For example, an embodiment may determine the height of a node by including the node itself so a node with no children has a height one. To further illustrate based on this variation, node 108 has height 1, node 104 has height 2, node 106 has height 1 and node 102 has height 3. The height of subtree may be zero, however if the subtree is the null set (contains no nodes). For example, node 104 has a right-sub-tree height of 0, as there is no right child.

A tree rotation may be characterized as an operation on a binary tree that changes the structure without interfering with the order of the elements or nodes of the tree. A tree rotation moves one node up in the tree and one node down. It is used to change the shape of the tree, and in particular to decrease its height by moving smaller subtrees down and larger subtrees up, resulting in improved performance of many tree operations. As noted above, a tree rotation operation may be performed after an insertion or deletion of a node to the AVL tree, as needed, to maintain the required height property of the AVL tree.

As described below in more detail, the memory management structure in an embodiment in accordance with techniques herein may be a modified AVL tree which may include one or more duplicate lists of nodes where each node in the same duplicate list represents a different free memory portion of the same size as other free memory portions in the same duplicate list. As also described in more detail below, basic operations for AVL trees such as node insertion, deletion and rotation may be performed on the modified AVL tree in an embodiment in accordance with techniques herein.

Figure 3:
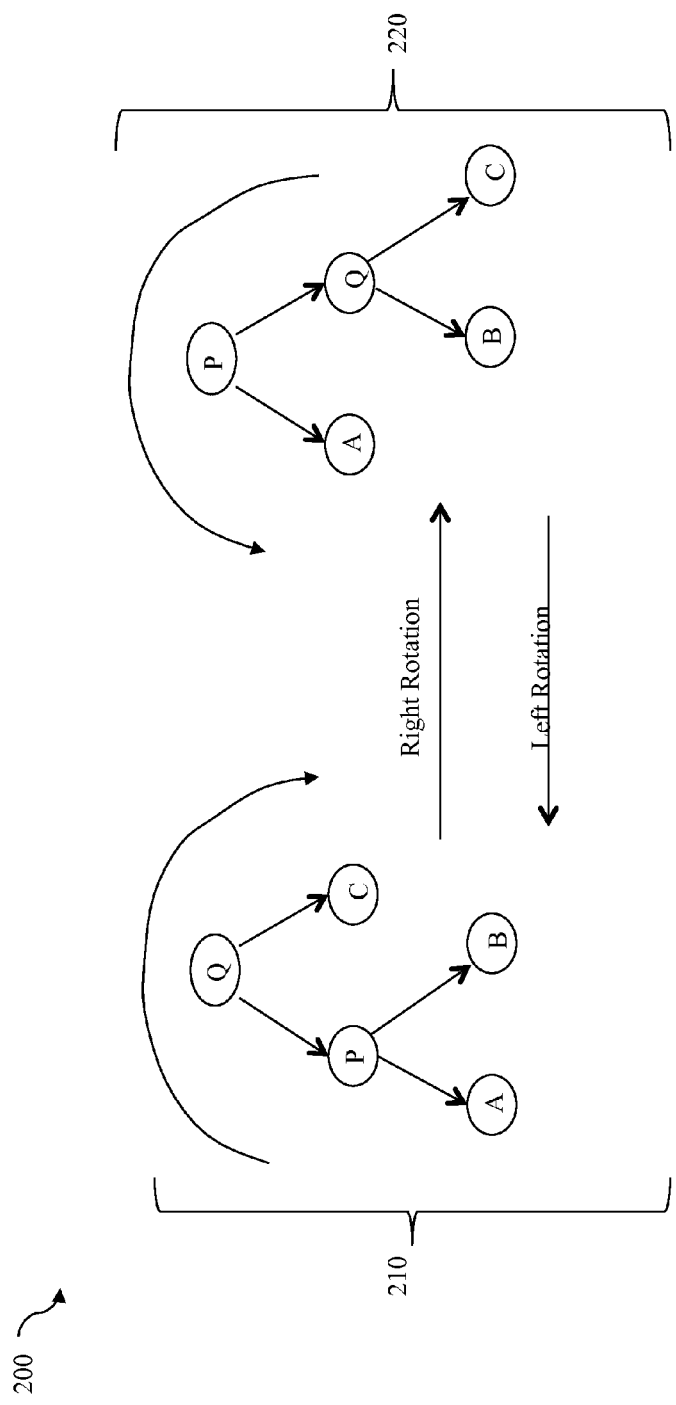
FIGS. 3 and 3B are examples illustrating operations that may be performed in an embodiment in accordance with techniques herein.

Referring to FIG. 3, shown is an example illustrating a tree rotation operation that may be performed in an embodiment in accordance with techniques herein. Element 210 may represent a start state when performing a right rotation to result in the final state as illustrated in 220. The right rotation operation as shown in the example 200 is performed with Q as the root in the starting state and is a right rotation on, or rooted at, Q. In this example, the right rotation operation results in a rotation of the tree to the right or in the clockwise direction. With a right rotation using starting state 210, node P becomes the new root node and node Q rotates into the position of its right child. The inverse operation of the right rotation is the left rotation, which results in a movement in a counter-clockwise direction. For the left rotation example, assume the start state is 220 and 210 represents the final state after the left rotation. With the left rotation start state 220, the root of the starting state is P (e.g., rooted at P). When a rotation has completed, the ordering or sorting property with respect to the keys is maintained such that for any node, all nodes in the left subtree have a key value less than the node's key, and all nodes in the right subtree have a key value are mode than the node's key. Additionally, the tree rotation renders the inorder traversal of the binary tree invariant. Inorder traversal of a binary tree having root node N with left subtree L and right subtree R is the nodes of L, inorder, followed by N, and then followed by the nodes of R inorder. For example with reference to 200, the inorder traversal of the nodes is A P B Q C.

When a subtree is rotated, the subtree side upon which it is rotated increases its height by one node while the other subtree decreases its height. For a right rotation, the right side or subtree increases its height by 1 and the left subtree decreases its height by 1. For a left rotation, the left side or subtree increases its height by 1 and the right side decreases its height by 1. This makes tree rotations useful for rebalancing tree such as for AVL trees when nodes are inserted or deleted into the tree.

For following discussion, let Root denote the parent node of the subtrees to rotate, and Pivot denote the child of the root node which will become the new parent node after the rotation has completed. Furthermore, the rotation direction is either left (for left rotation) or right (for right rotation) and let RS denote the child of the root node that is in the rotation direction and let OS denote the remaining child of the root node that is in the direction opposite rotation direction. A right child of a node may be referred to as "node.right" and a left child of a node may be referred to as "node.left". For example, for a right rotation in the example 200, the root is Q, the RS is C and the OS is P. The pseudo code for both a right and left rotation operation may be summarized as:
   Pivot=Root.OS
   Root.OS=Pivot.RS
   Pivot.RS=Root
   Root=Pivot
For a right rotation, the above becomes:
   Pivot=Root.left
   Root.left=Pivot.right
   Pivot.right=Root
   Root=Pivot
For a left rotation, the above becomes:
   Pivot=Root.right
   Root.right=Pivot.left
   Pivot.left=Root
   Root=Pivot Thus, such a tree rotation operation may operate on only 5 nodes and may not need to examine the rest of the tree to perform the operation and also maintain the required AVL tree properties.

After inserting a node, it is necessary to check each of the node's ancestors for consistency with the height property for AVL trees. A balance factor may be calculated as follows: balanceFactor=height(left subtree)−height(right subtree). For each node checked, if the balance factor remains −1, 0, or +1 then no rotations are necessary. However, if balance factor becomes less than −1 or greater than +1, the subtree rooted at this node is unbalanced. If insertions are performed serially, after each insertion, at most one of the following cases needs to be resolved to restore the entire tree to the rules of AVL.

Figure 3B:
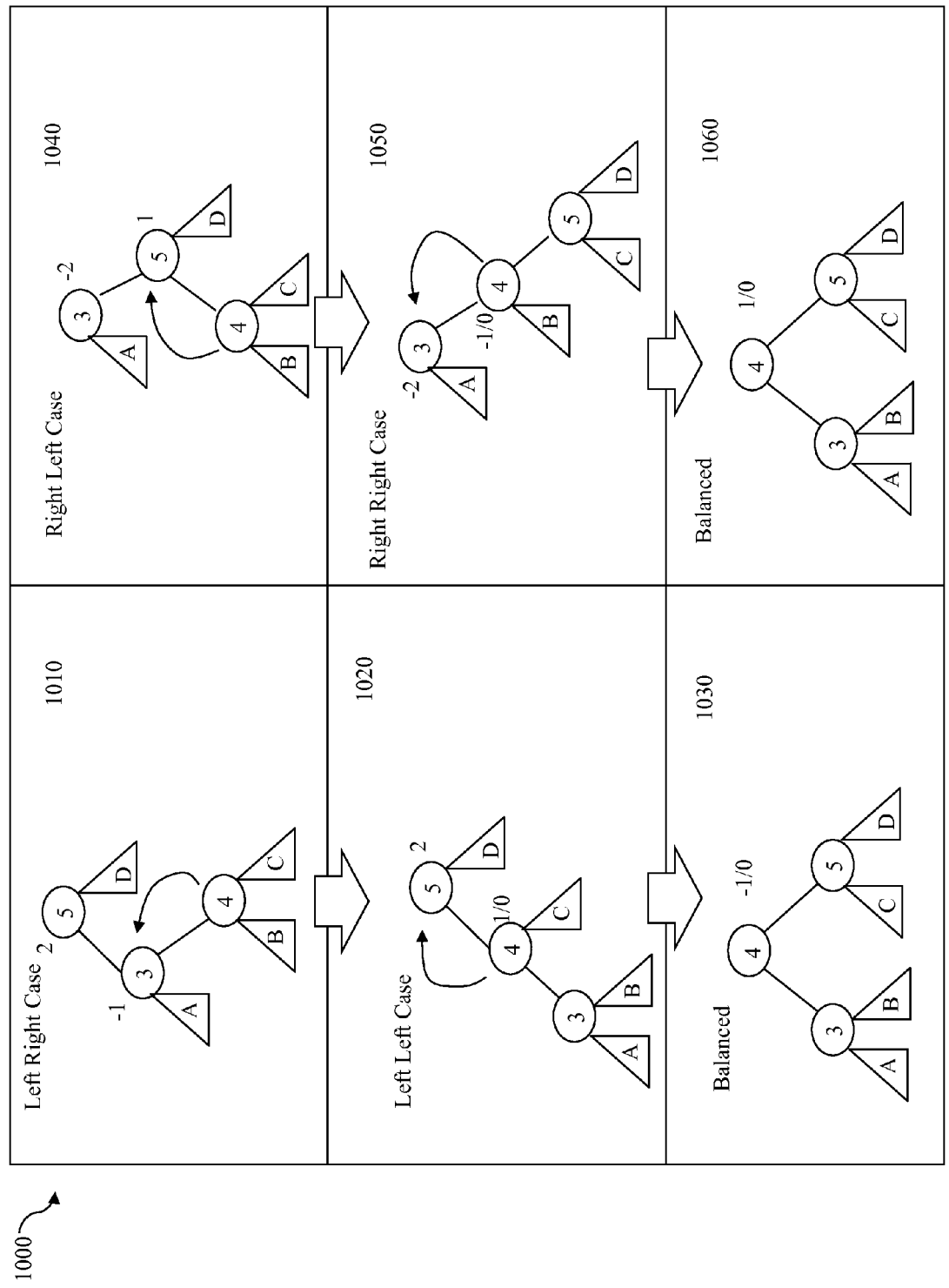

FIG. 3B, described below in more detail, is an illustration of how rotations cause rebalancing tree, and then further illustrates retracing nodes toward the root to update the balance factor of the nodes. In the example 1000, the numbered circles represent the nodes being balanced. The numbers inside the circles represent the key values of the tree nodes. The lettered triangles represent subtrees which are themselves balanced BSTs. A number next to a node denotes possible balance factors.

As an example illustrating rebalancing following insertion, consider the balance factor of a node L is 2 (as opposed to the other possible unbalanced value −2). With reference to FIG. 3B, this case is depicted in the left column of the illustration with L=5 (e.g., key value of node L is 5). Processing may be performed to then examine the left subtree (the larger one) with root P (e.g., P is the root node of the left subtree). If this subtree does not lean to the right—i.e. P has balance factor 0 or 1—the whole tree may be rotated to the right to get a balanced tree. This is labelled as the "Left Left Case" 1020 in the illustration with P=4. If the subtree does lean to the right—i.e. P has balance factor −1—processing may first rotate the subtree to the left and end up the previous case. The second case is labelled as "Left Right Case" 1010 with P=5 in the illustration.

If the balance factor of the node L is −2 (this case is depicted in the right column of FIG. 3B with L=3), the above-mentioned algorithm may be mirrored. For example, if the root P of the right subtree has balance factor 0 or 1, the entire tree may be rotated to the left to obtain a balanced tree as illustrated in the "Right Right Case" 1050 with P=4. If the root P of the right subtree has balance factor −1, the right subtree may be rotated to end up in the "Right Right Case".

The foregoing may be summarized as follows:
  if (balance_factor(L)==2) { //The left column 1010, 1020
    and 1030 let P=left_child(L)
    if (balance_factor(P)==−1) { //The "Left Right Case"
      rotate_left(P) //reduce to "Left Left Case"
    }
    //Left Left Case
    rotate_right(L);
  } else { // balance_factor(L)==−2, the right column 1040,
    1050, 1060 let P=right_child(L)
    if (balance_factor(P)==1) { //The "Right Left Case"
      1040 rotate_right(P) //reduce to "Right Right Case"
      1050
    }
    //Right Right Case
    rotate_left(L);
  }

The names of the cases in FIG. 3B refer to the portion of the tree that is reduced in height. In order to restore the balance factors of all nodes, first observe that all nodes requiring correction lie along the path used during the initial insertion. If the above procedure is applied to nodes along this path, starting from the bottom (i.e. the node furthest away from the root), then every node in the tree will again have a balance factor of −1, 0, or 1. Elements 1030 and 1060 each represent the resulting balanced tree for the different above-mentioned cases.

In connection with node deletions, let node X be the node with the value to be deleted, and let node Y be a node in the tree that needs to be located to take node X's place in the tree, and let node Z be the actual node taken out or removed from the tree.

Steps to consider when deleting a node in an AVL tree are the following:
1. If node X is a leaf or has only one child, skip to step 5. (node Z will be node X)
2. Otherwise, determine node Y by finding the largest node in node X's left sub tree (in-order predecessor) or the smallest in its right sub tree (in-order successor).
3. Replace node X with node Y (e.g., the tree structure doesn't change here, only the values). In this step, node X is essentially deleted when its internal values were overwritten with node Y's.
4. Choose node Z to be the old node Y.
5. Attach node Z's subtree to its parent (if it has a subtree). If node Z's parent is null, update root. (node Z is currently root)
6. Delete node Z.
7. Retrace the path back up the tree (starting with node Z's parent) to the root, adjusting the balance factors as needed.

As with all binary trees, a node's in-order successor is the left-most child of its right subtree, and a node's in-order predecessor is the right-most child of its left subtree. In either case, this node will have zero or one children. Delete it according to one of the two simpler cases above.

After deleting a node, processing may be described as above in connection with node insertions to maintain the height property and balance of the AVL tree. If the balance factor for the tree is 2 and that of the left subtree is 0, a right rotation must be performed on P. The mirror of this case is also necessary. The retracing can stop if the balance factor becomes −1 or +1 indicating that the height of that subtree has remained unchanged. If the balance factor becomes 0 then the height of the subtree has decreased by one and the retracing needs to continue. If the balance factor becomes −2 or +2 then the subtree is unbalanced and needs to be rotated to fix it. If the rotation leaves the subtree's balance factor at 0 then the retracing towards the root may continue since the height of this subtree has decreased by one. This processing for node deletion may contrasted to processing performed for node insertion where a rotation resulting in a balance factor of 0 indicated that the subtree's height has remained unchanged. The time required is O(log n) for lookup, plus a maximum of O(log n) rotations on the way back to the root, so the operation can be completed in O(log n) time.

In one embodiment described herein, the AVL tree utilized may be a modified version of an AVL tree in that duplicate key values for nodes are allowed. In other words, there may exist two nodes in the AVL tree having the same key value whereby such multiple nodes having the same key value may be included in a duplicate list. The modified AVL tree may be used in connection with management of free or available memory portions. Each node in the AVL tree may have a key value that represents a different size of a memory portion or chunk. The AVL tree may be organized with key values based on the sizes of the different free memory portions. In this manner, when a request is made for an amount of memory of size X, the AVL tree may be traversed to locate the smallest suitable memory portion having a size of at least X. Thus, each node in the tree has a key value of "N" denoting a different memory portion size. The size may be in any suitable units such as bytes. Associated with each node having a key value of N may be a duplicate list of one or more memory portions of that particular size N. An embodiment in accordance with techniques herein using the modified AVL tree may perform processing as described herein for AVL trees to maintain the required height property of a balanced AVL tree.

Figure 4:
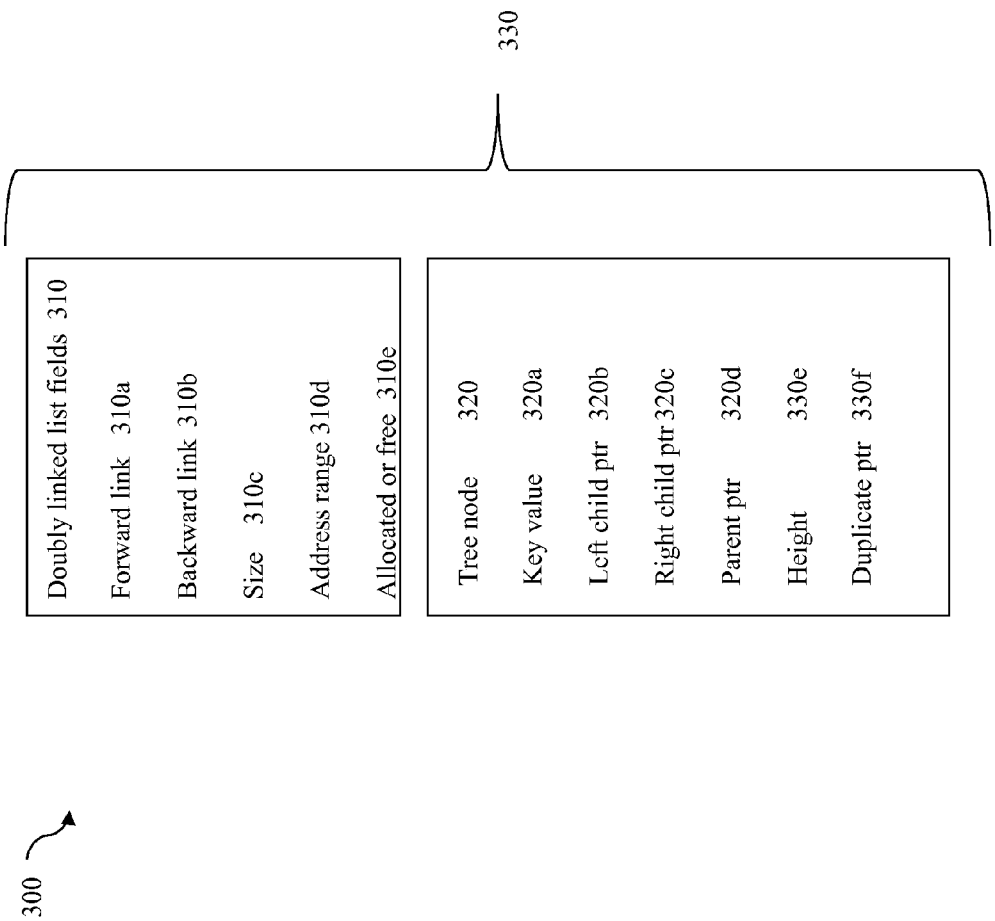
FIG. 4 is an example of a structure definition including fields of a management data structure in an embodiment in accordance with techniques herein.

Referring to FIG. 4, shown is an example of information that may be included in a structure in an embodiment in accordance with techniques herein. In the example 300, the information denoted by 330 may be included in a structure definition for each memory portion of the entire memory address range under management using techniques herein. Thus, the entire range of memory under management may be represented by a list of entries where each entry is a structure including the information 330. Such entries may be included on the list in ascending memory address order. As noted herein, such an entry may denote either an allocated memory portion or a free/available memory portion. Element 310 may include information regarding the memory portion represented as an entry on the doubly linked list where the entry may be either allocated or free/available. Element 310 may include the following: forward link or pointer (ptr) 310a, backward link or ptr 310b, size 310c, an address range 310d and an indicator 310e denoting whether the represented memory portion is allocated or free. Forward link ptr 310a is a pointer to the next entry in the list (e.g. ptr to another instance of a structure 330). Backward link ptr 310b is a pointer to the previous entry in the list (e.g. ptr to another instance of a structure 330). Size 310c may denote the size of the represented memory portion. The address range 310d denotes the memory address range of the represented memory portion. The address range 310d may be denoted by a starting address in combination with the size. Field 310e may be an indicator denoting whether the represented memory portion is allocated or free.

As will be appreciated by those skilled in the art, not all fields of 310 may be used in connection with representing a memory portion depending on the particular location in the list of entries. For example, the first entry on the list does not have a predecessor so the forward link field 310a of the first entry may be null. Similarly, the last entry of the list may have a value of null for its backward link field 310b.

If the entry 330 corresponds to an allocated memory portion, the information in the tree node 320 (e.g., tree node substructure) is not utilized or may otherwise be set to values denoting this allocated state. If the entry 330 corresponds to an unallocated memory portion, the entry may also include valid and relevant information in the tree node 320 corresponding to a node in the modified AVL tree as described herein where the node of the tree may include the following fields: a key value 320a (denoting the size of the free memory portion), a left child ptr 320b (identifying the node's left child node), a right child ptr 320c (identifying the node's right child node), a parent ptr 320d (denoting the node's parent), height 330e (identifying the height of the subtree having this node as the root), and duplicate ptr 330f (pointing to the next node in the tree corresponding to an allocated memory portion of the same size). Fields 320b, 320c, 320d and 330f may each be pointers to another tree node structure in the AVL tree. As will be appreciated by those skilled in the art, not all fields of the tree node 320 may be used in connection with representing a valid tree node. For example, a node in the tree may be a leaf node whereby the left and right child ptr fields 320b-c may both be null. It should be noted that the duplicate ptr 330f of a first node in the tree connects the first node to a list of any other tree nodes representing free memory portions of the same size as the first node.

As described in more detail below, the doubly linked list tracks the entire virtual memory address range of memory under management. Entries on the doubly linked list refer collectively to all free and allocated memory portions in ascending virtual memory address order. Each duplicate list, such as formed using the duplicate ptrs and parent ptrs of tree nodes, forms a list of free data portions of the same size. As will also be described in more detail below, an embodiment in accordance with techniques herein may perform coalescing of free memory portions as part of deallocation or free operation processing. Coalescing combines two or more free memory portions forming a contiguous virtual address subrange where each such memory portion has its own entry on the doubly linked list prior to coalescing. After coalescing, the two or more free memory portions from the contiguous virtual address subrange into a single free memory portion or chunk with a single corresponding entry on the doubly linked list structure of all memory portions (both free and allocated). In this manner, an embodiment in accordance with techniques herein may always combine contiguous free portions into a single free portion representing by a single entry on the doubly linked list and also represented by a single node in the tree.

In following paragraphs and figures, examples are provided to further illustrate use of the data structure as described herein that is a combination of a modified AVL tree and doubly linked list. In such figures, the doubly linked list is illustrated as one structure connected or linked to the AVL tree structure. Additionally, for simplicity, not all fields such as described in the example 300 are included in the example. Although system addresses may be in hexadecimal, following examples use decimal or base 10 values.

Although not explicitly mentioned in some of the following examples, it will be appreciated by those skilled in the art that various ancillary processing may be performed, for example, to initialize, update and maintain various fields of the structure and also perform pointer manipulation to nodes of the tree structure and doubly linked list, for example, in connection with inserting and deleting entries and nodes, performing tree rotation operations, and the like.

Figure 5:
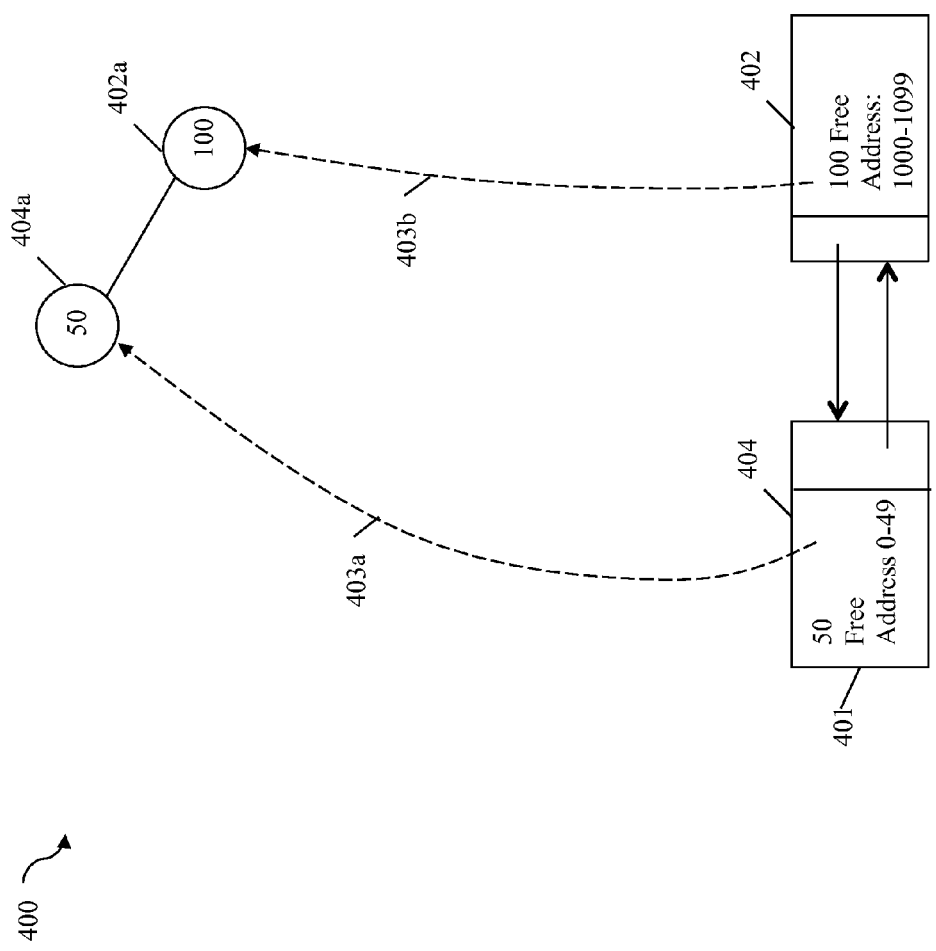
FIGS. 5, 6, 7, 8, 9, 10, 11, and 11B are examples illustrating data structures that may be used in an embodiment in accordance with techniques herein.

Referring to FIG. 5, shown is an example that may correspond to an initial start state at a first point in time. In this example 400, memory being managed includes a first portion that is a size of 50 bytes having a memory address range of 0-49 and a second portion that is a size of 100 bytes having a memory address range of 1000-1099. The example 400 includes a doubly linked list structure 401 with entries 404 and 402, and an AVL tree including nodes 402a and 404a. For the examples illustrated in connection with FIGS. 5-9, it is assumed that the total memory under management using techniques herein is as illustrated in the FIG. 5.

In the doubly linked list 401 of all memory portions, each of the entries 402 and 404 may correspond to an instance of the structure 330 as in FIG. 4. The above-mentioned first portion of free memory may be represented by entry 404 in the doubly linked list 401 and the above-mentioned second portion of free memory may be represented by entry 402 in the doubly linked list 401. Entry 404 denotes a size of 50 bytes for a free memory portion located at addresses 0-49. Entry 402 denotes a size of 100 bytes for a free memory portion located at addresses 1000-1099.

If an entry in the doubly linked list 401 represents a free portion of memory that is not allocated, there is a dashed line between the entry in the linked list 401 and a node of the AVL tree structure corresponding to that free memory portion. For example, entry 404 represents the first portion of free memory and the dashed line 403a links entry 404 of the linked list to node 404a of the tree to thereby represent the particular tree node for the free memory portion 404. Entry 402 represents the second portion of free memory and the dashed line 403b links entry 402 of the linked list to node 402a of the tree to thereby represent the particular tree node for the free memory portion 402. Node 402a denotes a key value of 100 corresponding to the size of the free memory portion for entry 402. Node 404a denotes a key value of 50 corresponding to the size of the free memory portion for entry 404. Node 404a is the root node of the AVL tree and node 402a is the right child of node 404a. It should be noted that such convention of using the dashed line to link a doubly linked list entry with an associated tree node is followed in subsequent figures. Additionally, within the linked list 401, an entry representing an allocated memory portion is denoted in figures as including "alloc" (e.g., entry 502 of FIG. 7) and an entry representing a free memory portion is denoted in figures as including "free" (e.g., 402 and 404 of FIG. 5).

Continuing with the example, assume a request R1 is received to allocate 10 bytes of memory. Processing performed to service memory allocation request R1 may include searching the nodes of the AVL tree structure to locate the node in the tree having a key value that is the smallest key value which is equal to or larger than 10, the size of the allocation request. In this example, a search identifies node 404a with a key value of 50. In searching the tree commences with the root node 404a. It is noted that 10 is smaller than 50 but there are no nodes in the tree having a key value less than 50 and also 10 or greater. Thus, in this simple example, the search terminates with a tree node 404a with a key value of 50.

More generally, searching for the node meeting the criteria of having a key value that is the smallest key value which is equal to or larger than the allocation request size commences with the root node, and a binary search of the tree is performed to locate a node meeting the foregoing criteria. Based on the BST properties, such a search may be performed by comparing the allocation request size, such as 10, to the key values of the tree nodes. To further illustrate searching such searching, assume for a moment that the modified AVL tree as in the example 100 to look for a key which is the smallest key value that is equal to or greater than 10. A first comparison is made between 10 and the root node's key of 100. Since 10 is less than 100, the search continues with the left subtree having a root node 104. A comparison is made between 10 and node 104's key value of 50. Since 10 is less than 50, the search then continues with the left subtree having a root node 108 with a key of 20. A comparison is made between 10 and node 108's key value of 20. Since 10 is less than 20, searching would continue with the left subtree. However, node 108 is a leaf node and has no child nodes so the search terminates with node 108 denoting that the 20 is the node meeting the criteria. As another example, assume the allocation request size is 60 rather than 10. In this case, searching of the tree in FIG. 2 commences with the root node 102 as described above where it is determined that 60 is less than 100. Searching then proceeds with the left subtree having root node 104 with a key of 50. A comparison is made between 60 and the node 104's key value of 50. It is determined that 60 is greater than 50 so searching continues with the right subtree of node 104. However, in this case, node 50 has no right child and thus no right subtree. Since 50 is smaller than the request size of 60, searching determines that the parent node 102 of node 104, has the smallest key value, 100, that is equal to or larger than the request size of 60. Thus, techniques herein may search the modified AVL tree, which is also a BST, to accordingly determine the node in the tree meeting the foregoing criteria.

Returning to FIG. 5 and continuing with our example 400, as noted above, the binary search of the AVL tree determines that node 404a with a key value of 50 is the smallest key value that is equal to or larger than the memory allocation request size of 10. The entry 404 in the linked list structure corresponding to the located node 404a is also determined and the 10 bytes of memory requested in memory allocation request R1 are obtained from the free memory portion represented by 404.

Figure 6:
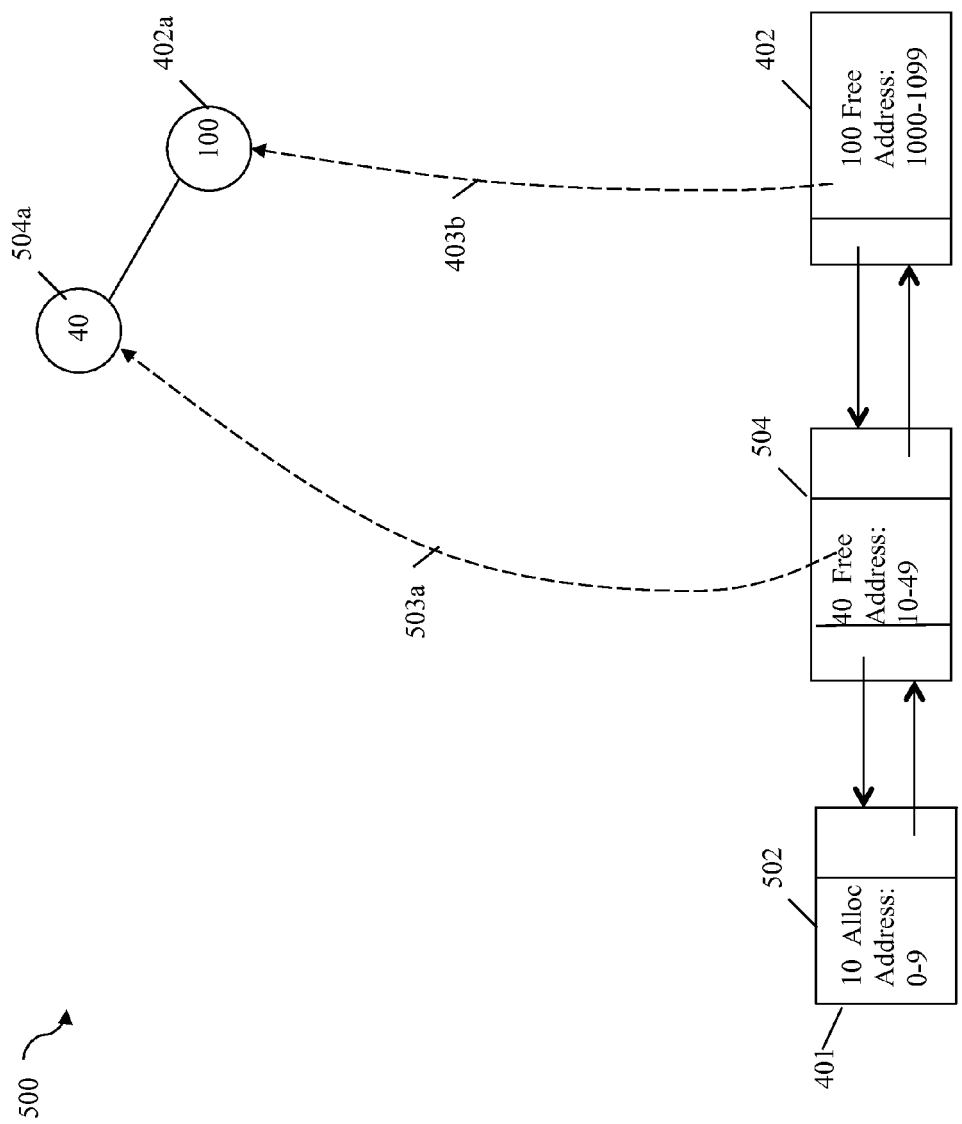

Referring to FIG. 6, shown is a snapshot of the updated structures of FIG. 5 after the requested 10 bytes of memory to service request R1 has been allocated. In this example, the 10 bytes allocated are at memory address bytes 0-9 from the free memory portion represented by entry 404 in previous example 400. The entry 404 in the linked list structure 401 is replaced with two entries 502 and 504. This represents the partitioning of the free memory portion of size 50 bytes represented by entry 404 into two portions—a first portion of size 10 for the allocated 10 bytes as represented by entry 502, and a second portion of size 40 for the remaining 40 free bytes as represented by entry 504. Entry 502 indicates that the 10 allocated bytes for request R1 is located at memory addresses 0-9. Entry 504 indicates the remaining 50 free bytes are located at memory addresses 10-49. Entry 402 is as described in FIG. 5.

The modified AVL tree has been updated whereby node 404a from FIG. 5 is replaced with node 504a of FIG. 6. Removal of 404a denotes that there is no longer a free memory portion of size 50. Including node 504a in place of 404a denotes that there is now a free memory portion of size 40. The dashed line 503a links entry 504 of the linked list to node 504a of the tree to thereby represent the particular tree node for the free memory portion corresponding to 504. More generally, processing may be performed on the AVL tree to remove node 404a and insert node 504a. Processing for insertion and deletion of nodes in an AVL tree may be performed as described herein and as known in the art.

Continuing with our example, a second request R2 may be received to allocate another 10 bytes of memory. Processing may be performed as described above in connection with request R1 whereby the AVL tree is searched to determine a node in the tree having the smallest key value that is equal to or larger than the allocation request size of 10. For this second request R2, such a search determines that node 504a having a key of 40 is the smallest key value of a tree node that is also equal to or larger than 10. The entry 504 in the linked list structure corresponding to the located node 504a is also determined and the 10 bytes of memory requested in memory allocation request R2 are obtained from the free memory portion represented by 504.

Figure 7:
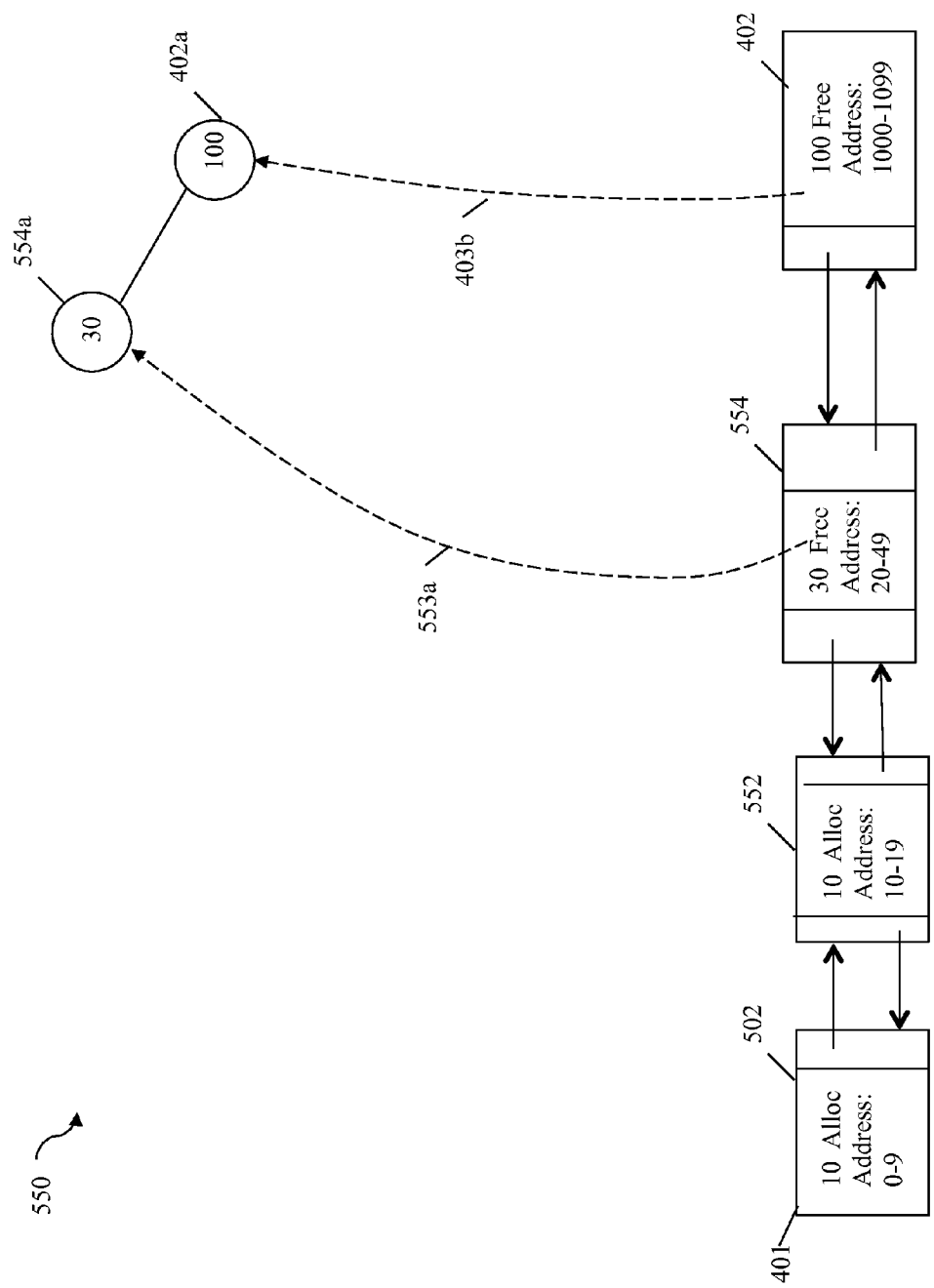

Referring to FIG. 7, shown is a snapshot of the updated structures of FIG. 6 after the requested 10 bytes of memory to service request R2 has been allocated. In this example, the 10 bytes allocated are at memory address bytes 10-19 from the free memory portion represented by entry 504 in previous example 500. The entry 504 in the linked list structure 401 is replaced with two entries 552 and 554. This represents the partitioning of the free memory portion of size 40 bytes represented by entry 504 into two portions—a first portion of size 10 for the allocated 10 bytes as represented by entry 552, and a second portion of size 30 for the remaining 30 free bytes as represented by entry 554. Entry 552 indicates that the 10 allocated bytes for request R2 are located at memory addresses 10-19. Entry 554 indicates the remaining 40 free bytes are located at memory addresses 200-49. Entries 402 and 502 are as described above in connection with FIG. 6.

The modified AVL tree has been updated whereby node 504a from FIG. 6 is replaced with node 554a of FIG. 7. Removal of 504a denotes that there is no longer a free memory portion of size 40. Including node 554a in place of 504a denotes that there is now a free memory portion of size 30. The dashed line 553a links entry 554 of the linked list to node 554a of the tree to thereby represent the particular tree node for the free memory portion corresponding to 554. More generally, processing may be performed on the AVL tree to remove node 504a and insert node 554a.

Continuing with our example, a third request R3 may be received to deallocate or free the 10 bytes of memory previously allocated for request R1. A search is performed of the linked list 401 to determine the corresponding entry for the relevant memory portion and associated address of 0-9 being deallocated or freed. A search determines entry 502 corresponds to the foregoing relevant memory portion being freed and its associated address of 0-9.

Figure 8:
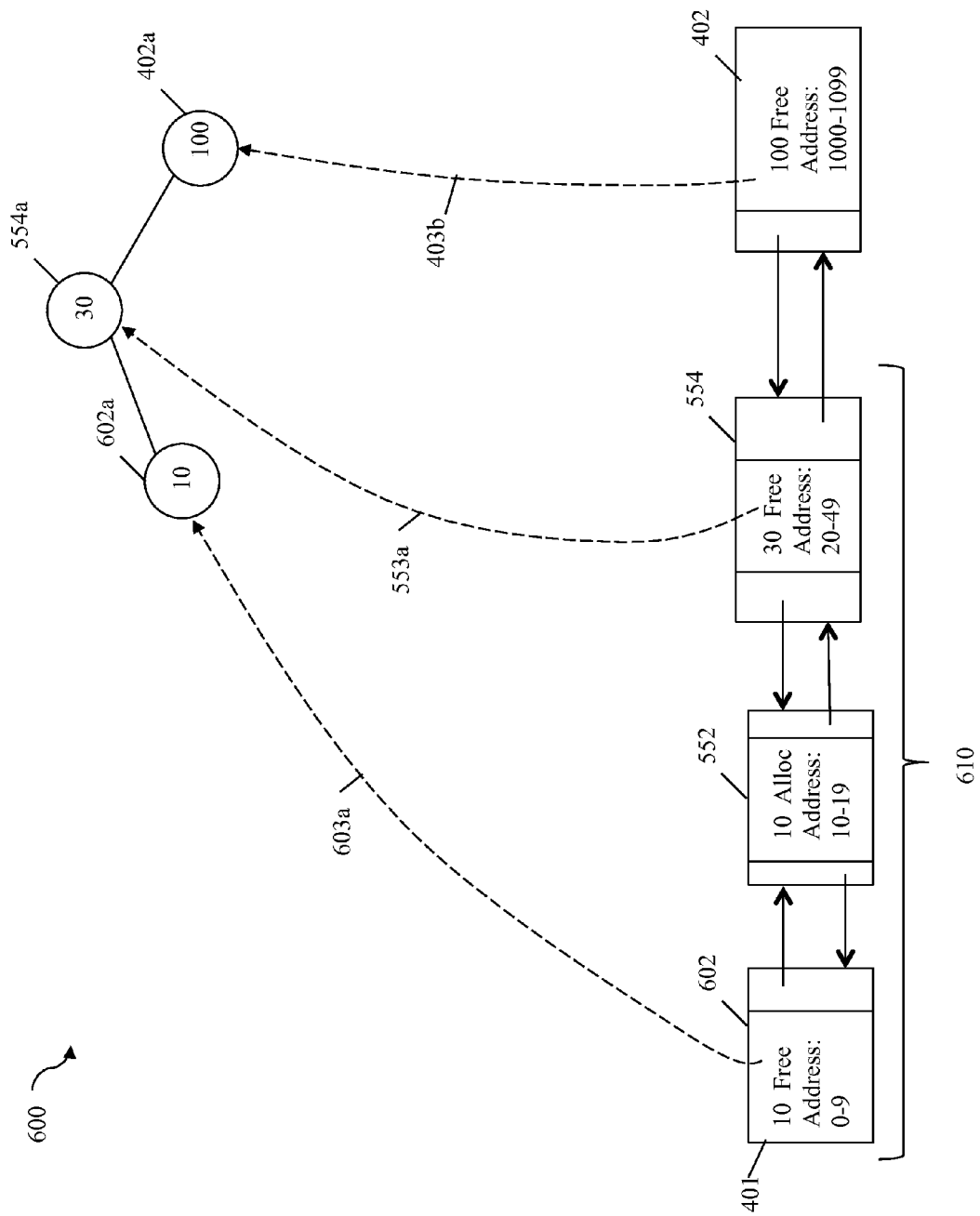
Figure 9:
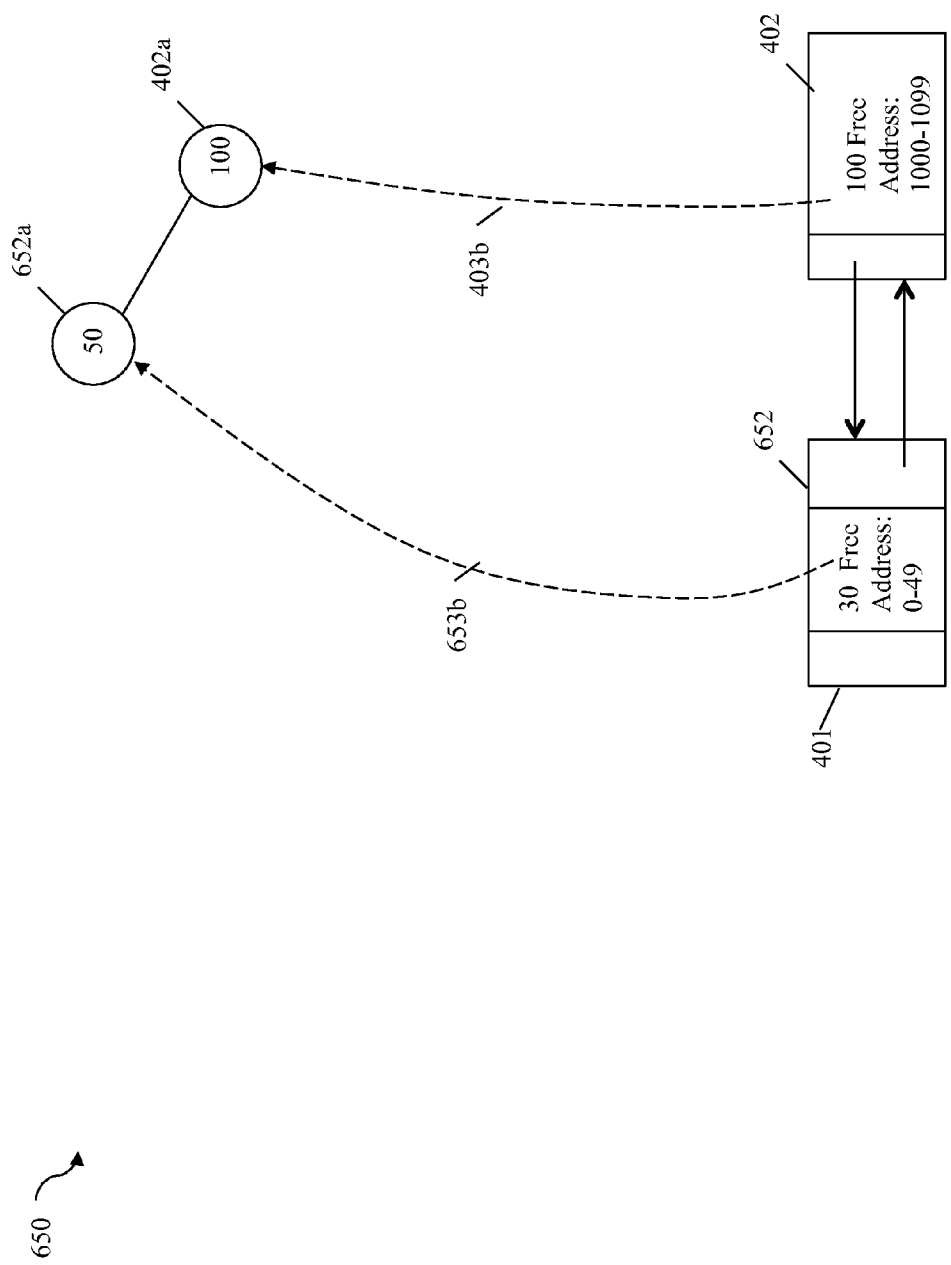

The entry 502 of FIG. 7, which denotes the corresponding memory portion as allocated (alloc in 502) is updated as in 602 of FIG. 8 to denote the memory portion as now free. Additionally, with reference to FIG. 8, a search is performed of the AVL tree to insert a node into the tree representing the newly added 10 byte free memory portion located at address 0-9. In this case, a search is performed to locate where to insert the new node into the tree with a key value of 10. Searching in this example indicates that there is currently no node in the tree with a key value of 10 and determines the point at which such a new node is inserted into the tree structure. As described elsewhere herein and known in the art, the location in the tree at which to insert the new node may be determined by performing a binary search of the tree and comparing the new node key value of 10 to key values of existing nodes.

In this example, searching results in inserting a new node 602a with a key value of 10 as a new left subchild of root node 554a. It should be noted that if the tree already included an existing node with a key value of 10, searching would locate such a node in the tree and insert the new node 602a as an entry in the duplicate list. With reference back to FIG. 4, if there is a first node in the tree with a key value of 10, the duplicate ptr field 330f of the first node may be updated to point to the new second node with the same key value of 10. Similarly, any additional new nodes having the same key value of 10 may be added by linking such new nodes in a chain or list using the duplicate ptr field 330f. The dashed arrow 603a links entry 602 of the linked list to node 602a of the tree to thereby represent the particular tree node for the free memory portion corresponding to entry 602.

Continuing with our example, a fourth request R4 may be received to deallocate or free the 10 bytes of memory previously allocated for request R2. A search is performed of the linked list 401 to determine the corresponding entry for the relevant memory portion and associated address of 10-19 being deallocated or freed. A search determines entry 552 corresponds to the foregoing relevant memory portion being freed and its associated address of 10-19.

Additionally, as part of the processing performed in response to a request to deallocate or free memory, coalescing of contiguous free memory portions may be performed. In connection with coalescing, with each memory portion freed, adjacent memory portions as represented by adjacent connecting entries in the list 401 may be examined to determine whether there are multiple contiguous free memory portions each having an entry in the list 401 that may be combined into a single larger memory portion represented by a single entry on the list 401. In this example, the memory portion corresponding to entry 552 is freed and processing may examine the memory addresses of adjacent entries 602 and 554. In this example, it is determined that all 3 entries 610 represent a single contiguous free memory portion having an address range of 0-49. Processing may include updating the linked list 401 by replacing entries 602, 552 and 554 of 610 with a single entry 652 of FIG. 9. Additionally, the tree structure is updated by deleting nodes 602a and 554a corresponding to the deleted entries 602 and 554, respectively. The tree structure is also updated to add a new node 652a of FIG. 9 corresponding to the newly added single entry 652.

With reference to FIG. 8 with nodes 554 and 602a deleted, a search is performed of the AVL tree to insert a node into the tree representing the combined 50 byte free memory portion located at address 0-49 as represented by entry 652. In this case, a search is performed to locate where to insert the new node into the tree with a key value of 50. Searching in this example indicates that there is currently no node in the tree with a key value of 50 and determines the point at which such a new node is inserted into the tree structure. As described elsewhere herein and known in the art, the location in the tree at which to insert the new node may be determined by performing a binary search of the tree and comparing the new node key value of 50 to key values of existing nodes.

In this example, searching results in inserting a new node 652a with a key value of 50 as a new root node. The dashed arrow 653a links entry 652 of the linked list to node 652a of the tree to thereby represent the particular tree node for the free memory portion corresponding to entry 652.

In connection with the foregoing, it should be noted that processing performed for an allocation request located a tree node and thus a free memory portion having a size that matched the size or amount of memory requested via the allocation request. It may be that the free memory portion located and used for the allocation has a size that is larger than the requested allocation size. In this case, the processing may include allocating the requested amount of memory from the free memory portion thereby leaving a free memory portion of a reduced size. For example, assume 50 bytes of memory are requested and the selected free memory portion is 100 bytes (e.g., smallest free memory portion having a size that is equal to or more than 50 bytes is 100 bytes). In this case, processing may allocate the requested 50 bytes from the 100 byte free memory portion leaving 50 free bytes. The doubly linked list may be updated to include a first entry corresponding to the allocated 50 bytes and another entry corresponding to the remaining 50 free bytes. The tree structure may also be updated to remove the tree node for the 100 byte free portion and insert a new tree node for the remaining 50 byte free portion.

As described elsewhere herein, insertion and deletion of a node from the tree structure includes updating the memory management structure (e.g., modified AVL tree and doubly linked list) as needed. Such processing for node insertion and deletion may also include processing to ensure that the tree is balanced and the height property maintained. Such processing may also include performing rebalancing as needed via rotations to ensure and maintain the height property for the AVL tree.

Described in following paragraphs are further examples illustrating rebalancing of the tree such as in connection with a node insertion operation that may be performed in an embodiment in accordance with techniques herein with different memory operations such as freeing a memory portion.

Figure 10:
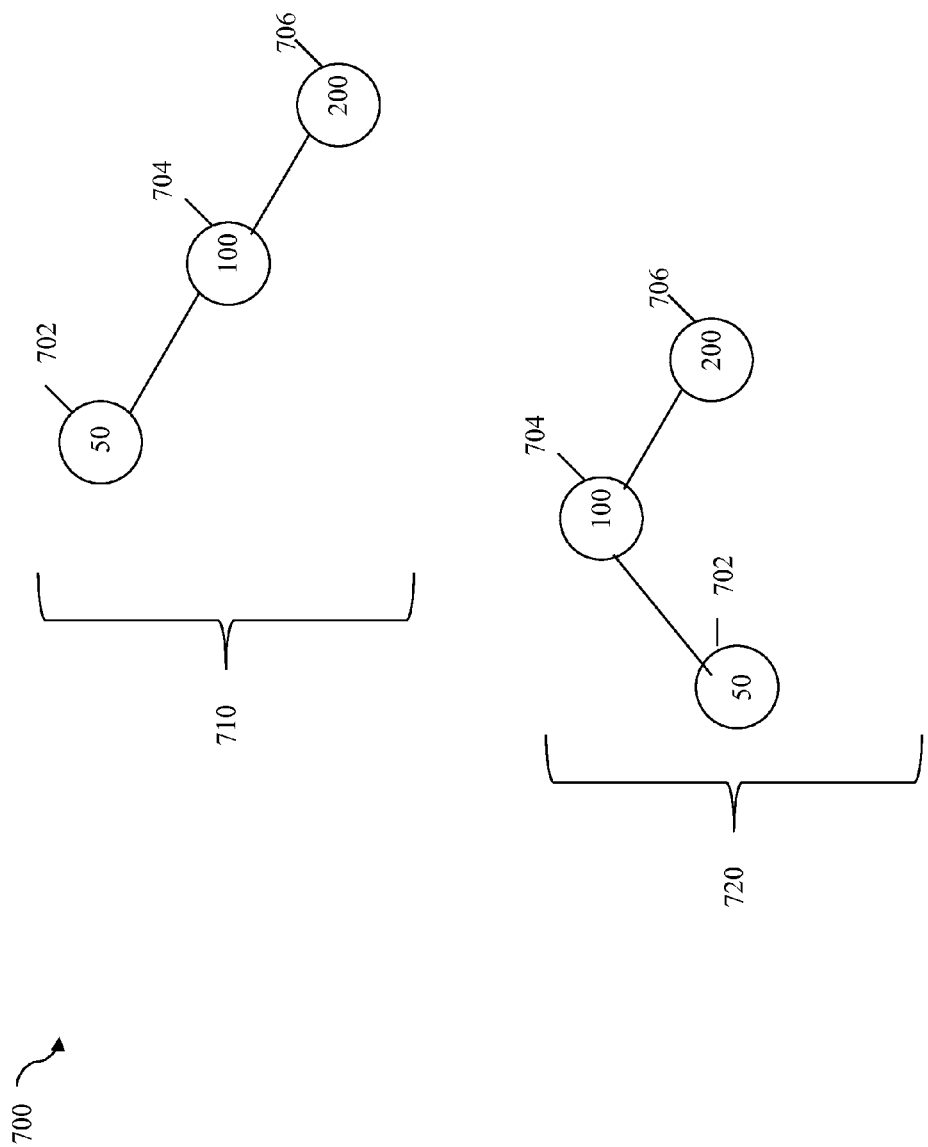

It should be noted that the example 700 of FIG. 10 and also other subsequent figures illustrate operations and processing performed on the modified AVL tree as may be included in an embodiment in accordance with techniques herein. For simplicity, such figures may omit illustrating the linked list structure which is still used in combination with the illustrated modified AVL tree since what is being described relates primarily to the tree-related operations. Although not illustrated in the example 700, a doubly linked list structure may be maintained with entries for both allocated and free or unallocated memory portions associated with, or connected to, corresponding tree nodes of the modified AVL tree such as described elsewhere herein (e.g., FIGS. 5-9).

Additionally, the examples illustrated and described in following paragraphs for node insertion assume that the node being inserted has a particular key value and there is no existing tree node already in the tree with the same key value. Recall that if there is already an existing node in the tree for a particular key value and processing now inserts a new node with that same key value, inserting the new node into the tree is simply connecting the new node to the existing node having the same key value using the duplicate ptr field 330f.

Reference is made to FIG. 10. In the example 700, assume there is an existing AVL tree with nodes 702 and 704. Subsequently, a deallocation or freeing of 200 additional bytes is performed resulting in node 706 with a key value of 200 being added to the tree. Thus, element 710 may represent the AVL tree in an embodiment in accordance with techniques herein at a first point in time when performing processing for the deallocation operation.

With reference to 710 of FIG. 10, after node 706 is inserted, insertion processing determines that the height of the left subtree of the root node is zero and the height of the right subtree of the root node is 2 thereby having a height difference of +2 in violation of the AVL tree height property (e.g., height difference being 1 or 0). Thus, the rebalancing of the tree of 710 is needed. As a result, processing may be performed to restore the tree to a balanced state having the required height property. As described elsewhere herein, such processing may include performing a rotation operation to balance the tree and restore the required height property.

Generally, after a node is inserted or deleted, processing is performed which traverses nodes on the path from the insertion point to the root node (e.g., all ancestors of the inserted node) and, for each such node, a determination is made as to whether the height property is maintained. In other words, for each such node, a determination is made as to whether the height property is maintained when considering the subtree rooted at the node. If the height property is violated for the node, it means that the subtree rooted at this node is unbalanced having a height difference of more than 1 between the subtrees of the left and right children of the node. As a result, either a left or right rotation operation may be performed to restore balance and thus restore the height property.

For example, with reference to the example 700, the height property is violated in the modified AVL tree as in 710 with respect to the subtree (tree) rooted at node 50 as mentioned above. Responsive to this height imbalance, a left rotation operation may be performed resulting in the tree as in 720. In 710, the root node is 702 with no left child node and a right child node 704. Based on the new node 706's key value of 200, node 706 is inserted as the right child of node 704. After the left rotation is complete, the root node is 704 with left child 702 and right child 706. Every time a rotation is done to rebalance the tree where the rotation is performed with respect to a subtree rooted at a first node, the recorded height field 330e of each node in the subtree is updated. For example, in 710, the following are the heights associated with the tree nodes:

Node Height
702 2
704 1
706 0

In 720, the following are the heights associated with the tree nodes:

Node Height
702 0
704 1
706 0

As long as the height property is maintained such as after completing every single insertion or deletion operation, an embodiment in accordance with techniques herein may perform at most one rotation following any single insertion or deletion of a tree node followed by any necessary updating of the node heights.

What will now be described is additional detail regarding deleting a node from the modified AVL tree in an embodiment in accordance with techniques herein. As described elsewhere herein, the tree may include multiple occurrences of tree nodes having the same key value (thus representing two free portions of the same size) whereby such tree nodes are incorporated into the tree structure by forming a list of the tree nodes having the same key values and associating the list with a single tree node or position in the tree structure. If there are multiple nodes having the same key value and thus multiple entries on the list, deleting one of the nodes involves removing the one node from the list.

The deletion operation described in following paragraphs generally applies to deleting a last or only occurrence of a tree node with the particular key value. After deleting such a node from the tree, processing performed may include traversing each node in the path between the point of deletion and the root node (e.g., ancestors of the deleted node) to check whether the height property is maintained at each such node. This is similar to as described above in connection with insertion processing. Also similarly, if there is a violation of the height property at a particular node, rebalancing such as through a left or right rotation as appropriate may be performed followed by updating height field values.

Generally, one embodiment in connection with deleting a first node having a first key value from the tree, that first node may be replaced with an existing second tree node where the second node has a key value which is closest to the first key value and which is also smaller than the first key value. Processing may then include traversing each ancestor node with respect to the foregoing second node to ensure that the height property is maintained and performing any needed rebalancing (e.g., via tree rotations) as described elsewhere herein.

Some removal cases may be characterized as special cases or instances of node deletion and processing may be accordingly varied for these instances. For example, when performing a free or deallocation operation, processing may include both deleting a node and inserting a new node in the tree structure. It may be that the newly inserted node effectively replaces the deleted node in the same location in the tree structure (e.g., having the same parent and same right and left children) but with an updated key value. For example, FIGS. 6 and 7 illustrate such a special case where a free memory portion such as represented by element 504 of FIG. 6 has its size reduced (e.g., from 40 bytes to 30 bytes) to result in an updated free memory portion size as represented by element 554 of FIG. 7. Similarly, when performing coalescing of memory portions, processing may result in merely updating a key value of an existing node in the tree to represent the updated increased free memory portion size where the location of the existing node in the tree structure remains the same.

Processing performed in an embodiment in accordance with techniques herein may recognize cases such as the foregoing and perform an optimization by avoiding the more general processing. In the foregoing case where the newly inserted node effectively replaces the deleted node in the same location in the tree structure (e.g., having the same parent and same right and left children) but with an updated key value, there is no need to further traverse ancestor nodes and perform any updating of height values and no need to perform processing of checking to ensure that the height property is maintained as a result of the combination of the node deletion and insertion since the AVL tree structure or topology has not been modified. The insertion and deletion operation effectively update an existing node in the tree which as a first key value before the update and a revised key value after the update and the updated node's position in the tree with the revised key is the same as the node's position in the tree with the first key value.

Figure 11:
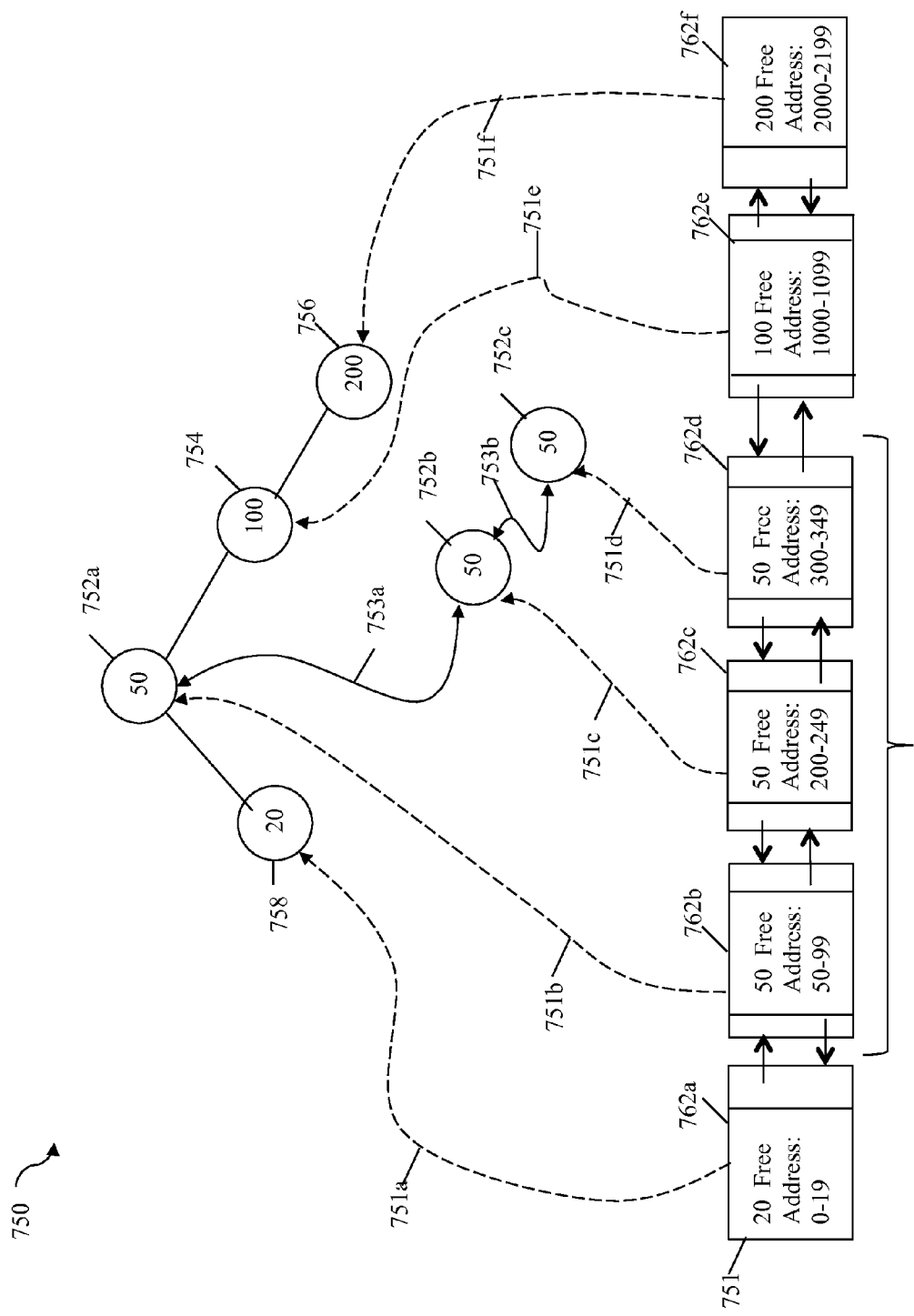

Referring to FIG. 11, shown is an example illustrating use of the duplicate ptr field for nodes having the same key value in an embodiment in accordance with techniques herein. The example 750 includes a doubly linked list 751 (of the entire managed memory address space including entries for both allocated and unallocated memory portions) and associated modified AVL tree structure consistent with other examples and description herein. The modified AVL tree includes nodes 758, 752a-c, 754 and 756. The linked list 751 includes entries 762a-f each corresponding to a free memory portion where each such free memory portion is not contiguous with respect to the memory address of any other free memory portion represented in the list 751. The example 750 follows conventions as described elsewhere herein such as in connection with FIGS. 5-9. Entry 762a represents a free memory portion of size 20 bytes located as memory address 0-19. Entry 762b represents a free memory portion of size 50 bytes located as memory address 50-99. Entry 762c represents a free memory portion of size 50 bytes located as memory address 200-249. Entry 762d represents a free memory portion of size 50 bytes located as memory address 300-349. Entry 762e represents a free memory portion of size 100 bytes located as memory address 1000-1099. Entry 762f represents a free memory portion of size 200 bytes located as memory address 2000-2199.

The AVL tree includes root node 752a with left child 758 and right child 754. Node 756 is further the right child nod node 754. Nodes 752b-c are included on the duplicate list of free memory portions of size 50 whereby nodes 752a-c may be connected in a second doubly linked list through use of the duplicate ptr field (e.g., 330f of FIG. 4) and parent ptr field (e.g., 320d of FIG. 4). It should be noted that nodes 752b-c do not add to the height of the tree. In one embodiment described herein, the parent ptr field of a particular node included on a duplicates list may point to the parent of the particular node which is actually the preceding node in the same duplicates list, and the duplicate ptr field of the particular node included on the duplicates list may point to the next node in the same duplicates list.

The dashed lines 751a-f link or associate, respectively, entries 762a-f of the linked list 751 to, respectively, nodes 758, 752a-c, 754, and 756 of the tree to thereby represent the particular tree nodes for the corresponding free memory portions.

Figure 11B:
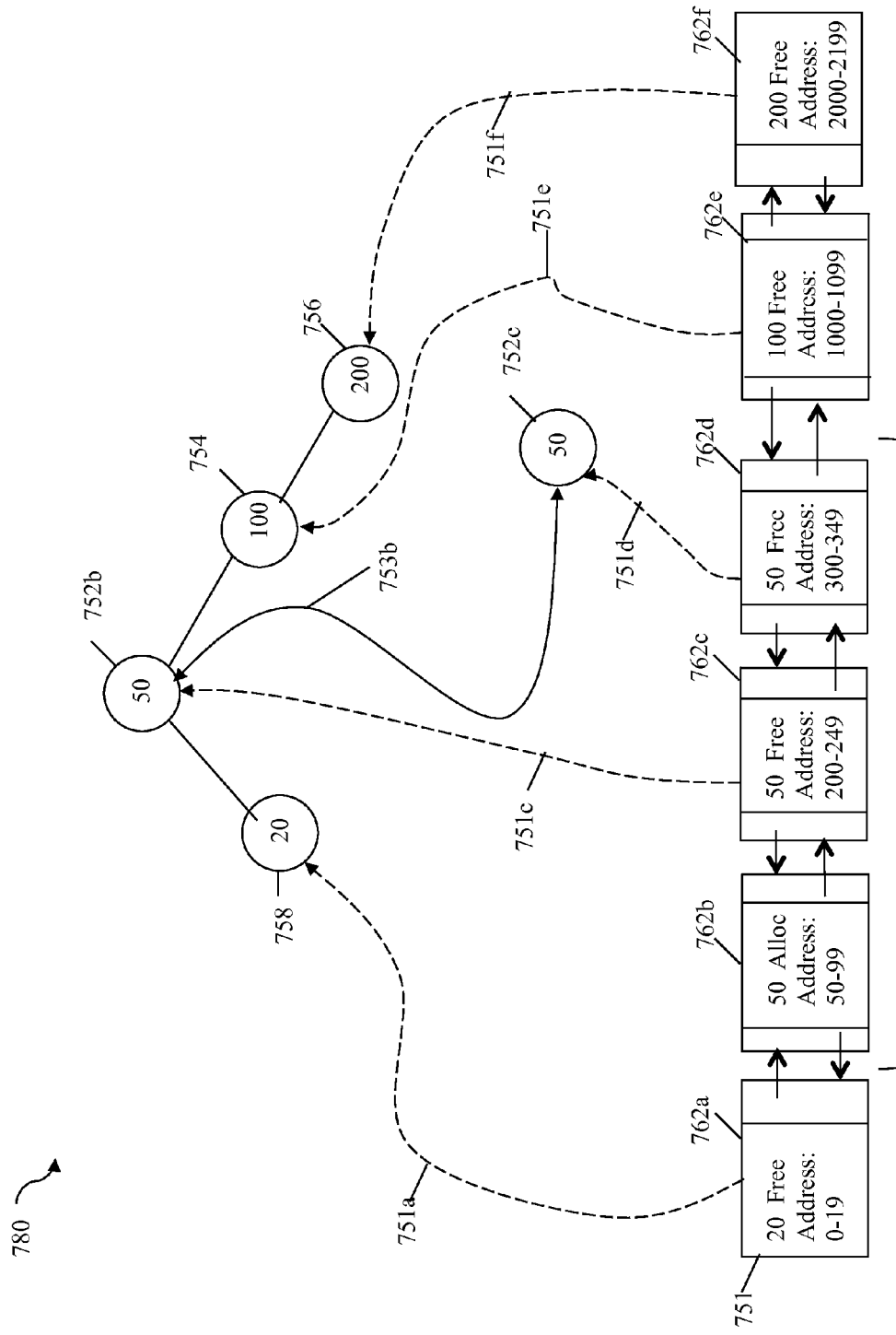

The example 750 may illustrate the memory management data structure as described herein at a point in time where there are 3 noncontiguous free memory portions each of size 50 bytes as represented by the entries 765 of the doubly linked list 751 and by the tree nodes 752a-c. In an embodiment, a first node of size 50 may be initially inserted into the tree such as represented by node 752a. At one or more subsequent points in time, two more free memory portions each of size 50 may also be freed or deallocated where of the two additional free memory portions of size 50 correspond to nodes 752b-c. The ptrs (pointers) 753a-b (representing use of parent ptr and duplicate ptr fields of nodes in the duplicates list) may be used to form the duplicates linked list (e.g., linked list of tree nodes for free memory portions of the same size and thus same key value) for size 50 bytes such that any new free memory portion of size 50 bytes has its tree node added to the front of the duplicates linked list. As memory portions of size 50 bytes are utilized for fulfilling memory allocation requests, memory portions are removed and used for such requests from the front of the duplicates linked list. For example, if there is a request for 50 bytes, processing is performed to search the tree for a node having a key value equal to or greater than 50 bytes and therefore locates the root node 752a. The particular 50 byte free memory portion used for the allocation request corresponds to the first tree node on the duplicates list of size 50 bytes. In this example, the free memory portion represented by 752a and 762b may be selected and used for fulfilling the allocation request. The tree structure is then modified to remove node 752a and also update the doubly linked list 751 resulting in the updated snapshot of the structures as in FIG. 11B.

Thus, an embodiment in accordance with techniques herein may utilize a memory management structure further including multiple associated or linked data structures. The multiple data structures may include a first linked list, such as a first doubly linked list described herein, that represents a complete virtual memory map of all virtual memory addresses corresponding to memory portions under management using techniques herein. The multiple data structures may include an AVL tree structure as described herein. The AVL tree includes nodes with key values where each tree node having a key value represents a free memory portion of a size denoted by the key value. The multiple data structures may also include a second linked list, such as a second doubly linked list also referred to as the duplicates list or duplicates linked list, used for tracking multiple free memory portions of the same size and thus each having the same key value. In an embodiment as described herein, the second linked list may include a first node and one or more additional nodes. The first node of the size may be located within the AVL tree structure as a formal or proper node of the structure contributing to the height of the tree. The remaining additional nodes of the same size may be included in the second linked list that is headed by and connected to the first node. The remaining additional nodes of the same size may be characterized as informal tree nodes which do not contribute to the height of the tree. In one aspect, the additional nodes may be characterized as not having an associated height and only formal or proper nodes may have an associated height.

As described herein, the memory management structure including the AVL tree (with associated single lists of duplicate nodes) integrated with the first doubly linked list may be used for efficient memory management. Use of the foregoing structure in an embodiment in accordance with techniques herein limits or reduces the number of tree nodes that need to be visited to perform an allocation or free request. In particular, the modified AVL tree (self-balancing binary tree) representing the free list facilitates that reduction. Additionally, the memory management structure includes a modified AVL tree with an enhancement in that the tree has an additional link in each node used to identify any duplicate free data portions having nodes in the tree.

The modified AVL tree may be created, for example, for each pool of memory where each node in the tree effectively represents a set of memory segments with a particular size. By organizing the tree by size, processing performed for memory management (e.g., allocation and deallocation request processing) dramatically reduces the potential number of nodes in the tree. As free segments of memory are added to the free tree, they either represent new nodes in the tree (i.e., there are no other nodes of that size) or it is added as a duplicate of an existing size node.

When memory needs to be allocated, processing may locate the first node in the size tree that is greater than or equal to the requested size, and remove it from the tree so that it can be allocated. If the node located has duplicates, processing may utilize the first duplicate in order to eliminate the need to walk the list of duplicates. If the node corresponding to a free memory portion selected for servicing a memory allocation has a size larger than the amount of memory requested, then processing may partition the free memory portion into an allocated portion and a remaining free portion having a node inserted into the tree.

When memory is freed and there is no coalescing needed, a node may be inserted into the tree corresponding to the size of the deallocated memory portion. If a node of that size doesn't exist, processing as described herein may insert a corresponding node into the tree at a location as in a typical AVL tree. However, if a node of that size already exists, then processing may be performed to optimize the insertion of the node by simply inserting the node at the front of the duplicate list of the existing node of the same size.

As described herein, when freeing memory, coalescing may be performed to combine contiguous portions of free memory into a single combined free memory portion having a single node in the tree and a single entry in the first doubly linked list representing all memory portions (both allocated and unallocated) under management using techniques herein. The first doubly linked list may be characterized as a global list of all memory portions (contains free and allocated). When performing processing to deallocate memory having an corresponding entry on the list, processing may examine the entry's predecessor and successor in the global list. Processing of a request to deallocate or free a currently allocated memory portion at a particular memory address may include traversing the first doubly linked list and looking for an entry representing the memory portion being freed (e.g., matching memory address), updating entry of list to denote the previously allocated portion is now free, and inserting a new node in tree corresponding to the deallocated memory portion. Processing may also include coalescing whereby the newly freed memory portion may be combined with adjacent contiguous free memory portions into a single collective free memory portion. In this case, the single combined free memory portion is represented by a single entry on the first doubly linked list and also has a single corresponding single node in the tree. In this manner, each of the free memory portions represented by a node in the tree is non-contiguous with respect to every other memory portion represented by a node in the tree.

Figure 12:
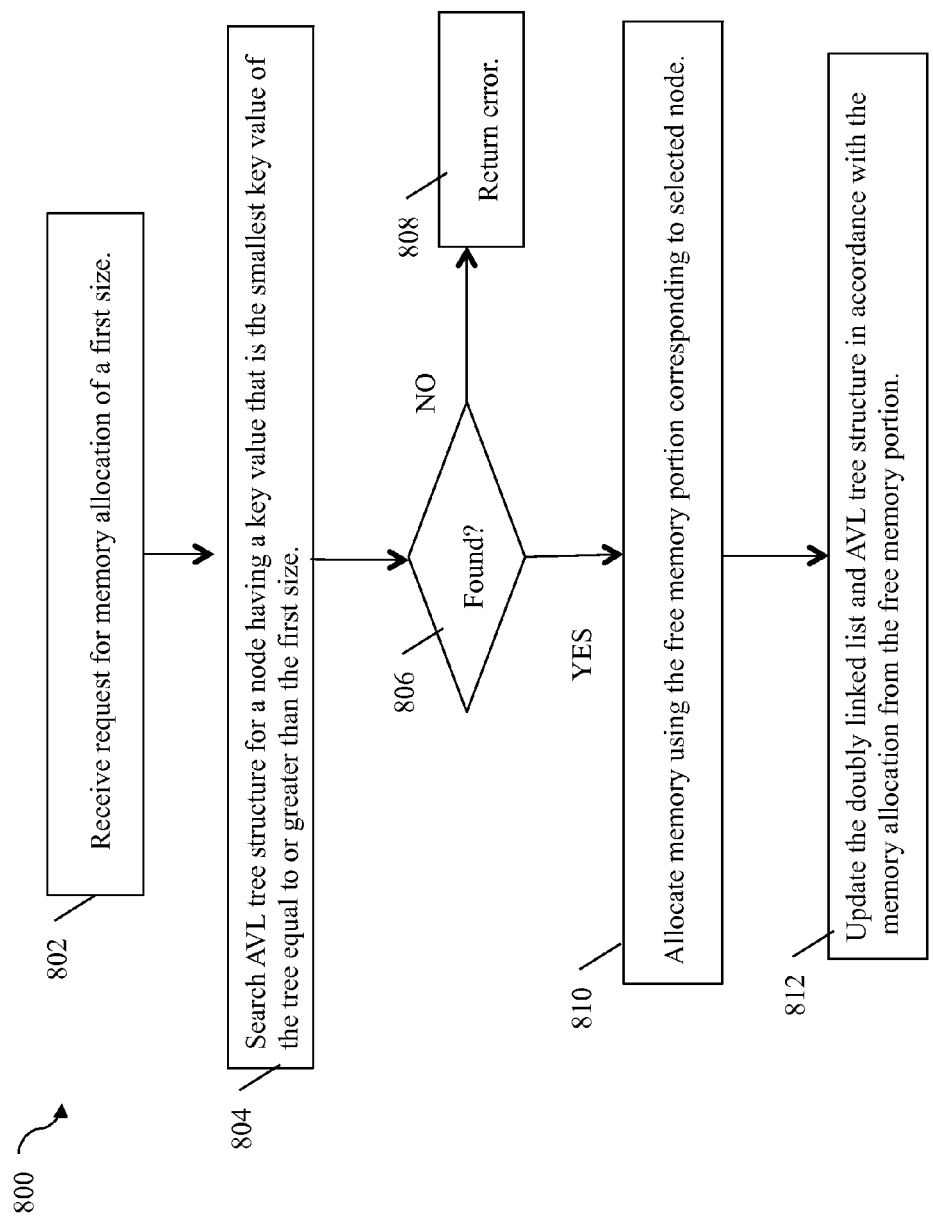
FIGS. 12 and 13 are flowcharts of processing steps that may be performed in an embodiment in accordance with techniques herein.

Referring to FIG. 12, shown is a flowchart of processing steps that may be performed in an embodiment in accordance with techniques herein for servicing a memory allocation request. The steps of 800 summarize processing described above. At step 802, a request is received requesting a memory allocation of a first size. In step 804, processing is performed to search the AVL tree structure for a node having a key value that is the smallest key value of the tree which is also equal to or greater than the first size. At step 806, a determination is made as to whether a step 804 located a node in the tree. If step 806 evaluates to no, processing proceeds to step 808 to return an error. In this case, it may be determined that there is no free memory portion of the requested size available at the current time. If step 806 evaluates to yes where a node of the tree is selected, control proceeds to step 810. In step 810, memory is allocated to fulfill the request using the free memory portion corresponding to the selected node (e.g., selected in step 804). At step 812, processing is performed to perform any needed updates to the first doubly linked list structure (e.g., 401 of FIGS. 5-9) and the AVL tree in accordance with the memory allocation from the free memory portion. Step 812 may be characterized as high level and may include, for example, performing any necessary insertion and/or deletions of tree nodes and the first doubly linked list entries, any necessary tree balancing and rotations to maintain the AVL tree height property, and special case processing. If the free memory portion is larger than the size of the allocation request, step 812 processing may include partitioning the free memory portion into an allocated first portion and a remaining free portion and accordingly updating the doubly linked list and tree structure. Step 812 processing may include performing any necessary updates the second doubly linked list of duplicates (e.g., of duplicate tree nodes representing free portions of the same size). More generally, step 812 may include any necessary processing depending on the particular allocation request, free memory portion used to fulfill the allocation request, and current state of the memory management structure.

Figure 13:
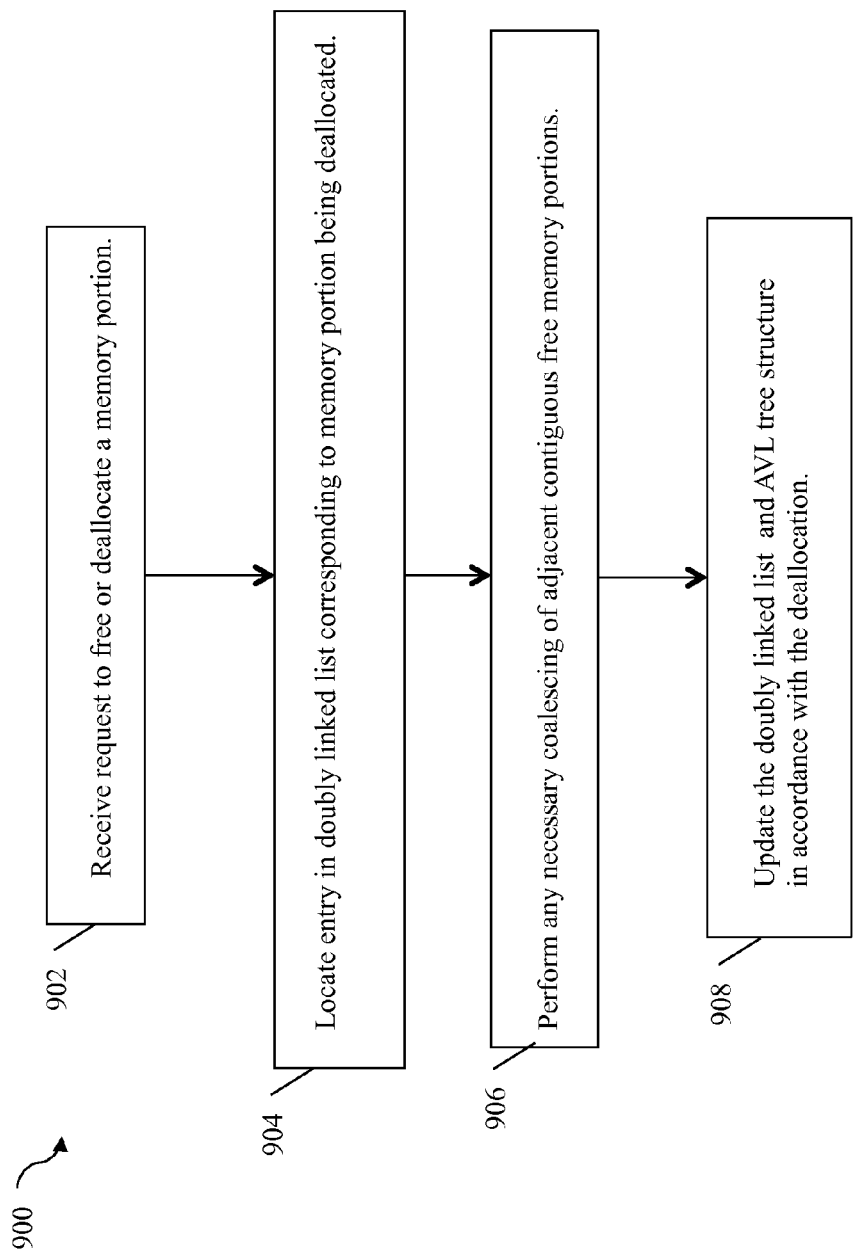

Referring to FIG. 13, shown is a flowchart of processing steps that may be performed in an embodiment in accordance with techniques herein for servicing a memory deallocation request to free a previously allocated memory portion. The steps of 900 summarize processing described above. At step 902, a request is received to free or deallocate a memory portion. At step 904, processing may be performed to locate the memory portion's corresponding entry in the first doubly linked list. At step 906, processing is performed for any necessary coalescing of adjacent contiguous free memory portions. At step 908, processing is performed to generally update the first doubly linked list and AVL tree structure in accordance with the memory deallocation.

Step 908 may be characterized as high level and may include, for example, performing any necessary insertion and/or deletions of tree nodes and entries in the first doubly linked list, any necessary tree balancing and rotations to maintain the AVL tree height property, and special case processing. Step 908 processing may include searching the AVL tree for a location to insert a new node corresponding to the deallocated memory portion, or a memory portion that is combination of free portions as a result of coalescing. Step 908 processing may include performing any necessary updates to the second doubly linked list of duplicates (e.g., of duplicate tree nodes representing free portions of the same size) such as to add a new tree node to the list since there are multiple tree nodes each corresponding to a different free memory portion of the same size. More generally, step 908 may include any necessary processing depending on the particular deallocation request, memory portion being deallocated, and current state of the memory management structure.

Although techniques herein are described in an embodiment in connection within a data storage system, variations and generalization of techniques herein will be readily appreciated by those of ordinary skill in the art. For example, techniques herein may be generally used in any suitable system, with any type of request and resources, and the like. Additionally, described herein are particulars such as regarding the data structures used to implement lists, and the like. For example, lists herein may be implemented as linked list data structures well known in the art. However, an embodiment may generally use other equivalent and suitable data structures known in the art.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A system comprising:
    a processor; and
    a memory including code stored therein that, when executed, performs a method of memory management comprising:
        receiving a memory management data structure including a tree structure and a first list, the tree structure including one or more nodes, wherein each of the one or more nodes represents a free memory portion of a particular size used as a key value for said each node, said tree structure being organized in accordance with one or more key values of the one or more nodes such that, for a first of the one or more nodes having a first key value, each other node of the tree structure having a key value less than the first key value of the first node is included in a left subtree of the first node, and each other node of the tree structure having a key value more than the first key value of the first node is included in a right subtree of the first node; and the first list representing a memory map of memory addresses corresponding to different memory portions, the first list including one or more entries, each of the one or more entries representing a memory portion that has an associated memory address range, wherein each entry of the first list denotes either an allocated memory portion including only allocated memory or otherwise denotes a free memory portion including only available memory, wherein each entry of the first list representing a free memory portion is associated with a node of the tree structure;

receiving a first request to allocate a first portion of memory of a first size;

searching the tree structure to determine a first free memory portion from which to allocate memory for the first request; and updating the memory management data structure in accordance with allocating memory from the first free memory portion for the first request.

2. The system of claim 1, wherein the first list includes at least one entry corresponding to an allocated memory portion and at least one entry corresponding to a free memory portion available for allocation.

3. The system of claim 2, wherein the at least one entry corresponding to a free memory portion is associated with one node of the tree structure.

4. The system of claim 1, wherein at least one node of the tree structure representing the first free memory portion of the first size is included in a duplicate list, the duplicate list including a plurality of nodes of the tree structure where each node of the duplicate list represents another free memory portion of the first size.

5. The system of claim 4, wherein a height of a particular node in the tree structure is a distance of a longest path from the particular node to a leaf node and said tree structure is balanced such that, for a pair of sibling nodes of the tree structure, a difference between a first height of a first of the sibling nodes and a second height of a second of the sibling nodes is not more than one (1).

6. The system of claim 5, wherein only one of the nodes in the duplicate list contributes to the height of the tree structure and each other node of the duplicate list besides said one node does not have an associated height with respect to the tree structure whereby said each node does not contribute to the height of the tree structure.

7. The system of claim 1, wherein the memory is included in a data storage system.

8. The system of claim 1, wherein the first list is a doubly linked list.

9. The system of claim 4, wherein the duplicate list is a doubly linked list.

10. A method for managing memory comprising:
receiving, using a processor, a memory management data structure including a tree structure and a first list, said tree structure including one or more nodes, wherein each of the one or more nodes represents a free memory portion of a particular size used as a key value for said each node, said tree structure being organized in accordance with one or more key values of the one or more nodes such that, for a first of the one or more nodes having a first key value, each other node of the tree structure having a key value less than the first key value of the first node is included in a left subtree of the first node, and each other node of the tree structure having a key value more than the first key value of the first node is included in a right subtree of the first node, said first list representing a memory map of memory addresses corresponding to different memory portions, the first list including one or more entries, each of the one or more entries representing a memory portion that has an associated memory address range, wherein each entry of the first list denotes either an allocated memory portion including only allocated memory or otherwise denotes a free memory portion including only available memory, wherein each entry of the first list representing a free memory portion is associated with a node of the tree structure;

receiving, using a processor, a first request to allocate a first portion of memory of a first size;

searching, using a processor, the tree structure to determine a first free memory portion from which to allocate memory for the first request; and updating, using a processor, the memory management data structure in accordance with allocating memory from the first free memory portion for the first request.

11. The method of claim 10, wherein said updating includes updating the tree structure by performing any one or more of deleting a node from the tree structure representing the first free memory portion and modifying a key value of a node from the tree structure representing the first free memory portion.

12. The method of claim 10, wherein the first free memory portion is represented by a first entry of the first list and wherein the method further includes:
determining whether a size of the first free memory portion is equal to or more than the first size;
if it is determined that the size of the first free memory portion is equal to the first size, said updating includes:
updating the first entry from the first list to denote the first free memory portion is now allocated;
deleting a node from the tree structure representing the first free memory portion; and
performing, after said deleting, second processing to ensure the tree structure is balanced in terms of height, wherein a height of a particular node in the tree structure is a distance of a longest path from the particular node to a leaf node and said tree structure is balanced such that, for a pair of sibling nodes of the tree structure, a difference between a first height of a first of the sibling nodes and a second height of a second of the sibling nodes is not more than one (1).

13. The method of claim 12, wherein the method further includes:
if it is determined that the size of the first free memory portion is more than the first size, said updating includes:
updating the first entry from the first list to correspond to the first size and represent an allocated memory portion;
creating a new entry of the first list to represent a remaining amount of unallocated memory of the first free memory portion after allocating an amount of memory equal to the first size;
inserting into the tree structure a node representing a free memory portion having a size equal to the remaining amount of unallocated memory;
performing, after said inserting, second processing to ensure the tree structure is balanced in terms of height, wherein a height of a particular node in the tree structure is a distance of a longest path from the particular node to a leaf node and said tree structure is balanced such that, for a pair of sibling nodes of the tree structure, a difference between a first height of a first of the sibling nodes and a second height of a second of the sibling nodes is not more than one (1).

14. The method of claim 10, wherein said searching includes comparing one or more key values of one or more nodes of the tree structure to said first size to locate a free memory portion having a size that is at least the first size.

15. The method of claim 10, wherein a first set represents one or more free memory portions each having a node representing said each free memory portion in the tree structure and each being a size that is at least the first size, and wherein the size of the free memory portion is a minimum size of all one or more free memory portions of the first set.

16. The method of claim 10, wherein the first free memory portion has a size that is larger than the first size and said updating includes inserting a new node into the tree structure representing a free memory portion having an associated size that is a difference between a current size of the free memory portion prior to allocating memory for the first request and the first size.

17. The method of claim 10, further comprising:
receiving, using a processor, a second request to deallocate a second memory portion of a second size whereby said second memory portion has been allocated in connection with a prior memory allocation request.

18. The method of claim 17, further comprising:
updating, using a processor, an entry of the first list corresponding to the second memory portion to indicate that the second memory portion is now an unallocated memory portion.

19. The method of claim 17, further comprising:
locating, using a processor, a first entry of the first list corresponding to the second memory portion;
determining, using a processor, one or more additional entries in the list representing free memory portions having memory addresses contiguous with memory addresses of the second memory portion; and
replacing, using a processor, the first entry and the one or more additional entries with a single entry on the first list, said single entry representing a single memory portion that is a combined memory portion including the second memory portion and one or more additional memory portions represented by the one or more additional entries.

20. A non-transitory computer readable medium comprising code stored thereon that, when executed, performs a method that manages memory, the method comprising:
receiving a memory management data structure including a tree structure and a first list, said tree structure including one or more nodes, wherein each of the one or more nodes represents a free memory portion of a particular size used as a key value for said each node, said tree structure being organized in accordance with one or more key values of the one or more nodes such that, for a first of the one or more nodes having a first key value, each other node of the tree structure having a key value less than the first key value of the first node is included in a left subtree of the first node, and each other node of the tree structure having a key value more than the first key value of the first node is included in a right subtree of the first node, said first list representing a memory map of memory addresses corresponding to different memory portions, the first list including one or more entries, each of the one or more entries representing a memory portion that has an associated memory address range, wherein each entry of the first list denotes either an allocated memory portion including only allocated memory or otherwise denotes a free memory portion including only available memory, wherein each entry of the first list representing a free memory portion is associated with a node of the tree structure;
receiving a first request to allocate a first portion of memory of a first size;
searching the tree structure to determine a first free memory portion from which to allocate memory for the first request; and
updating the memory management data structure in accordance with allocating memory from the first free memory portion for the first request.

* * * * *